(12) United States Patent
Swanson

(10) Patent No.: US 9,714,778 B2
(45) Date of Patent: Jul. 25, 2017

(54) THERMOELECTRICALLY COOLED CARAFE AND ASSOCIATED COOLING SYSTEM

(71) Applicant: LIKUMA LABORATORIES, LLC, Philadelphia, PA (US)

(72) Inventor: Kurt M. Swanson, Philadelphia, PA (US)

(*) Notice: Subject to any disclaimer, the term of this patent is extended or adjusted under 35 U.S.C. 154(b) by 79 days.

(21) Appl. No.: 14/548,247

(22) Filed: Nov. 19, 2014

(65) Prior Publication Data

US 2015/0135728 A1    May 21, 2015

Related U.S. Application Data

(60) Provisional application No. 61/906,826, filed on Nov. 20, 2013.

(51) Int. Cl.
*F25B 21/00* (2006.01)
*F25B 21/02* (2006.01)
*A47J 41/00* (2006.01)
*B67D 3/00* (2006.01)

(52) U.S. Cl.
CPC ........... *F25B 21/02* (2013.01); *A47J 41/0038* (2013.01); *B67D 3/0009* (2013.01); *F25D 2331/803* (2013.01); *F25D 2700/06* (2013.01); *F25D 2700/16* (2013.01)

(58) Field of Classification Search
CPC .......... F25B 21/00; F25B 21/02; F25B 21/04; F25B 2321/02
See application file for complete search history.

(56) References Cited

U.S. PATENT DOCUMENTS

2010/0018982 A1* 1/2010 Liu .................. A47J 27/004
                                            220/592.17
2012/0312031 A1* 12/2012 Olsen ................ F25B 21/02
                                            62/3.62

* cited by examiner

*Primary Examiner* — Ryan J Walters
*Assistant Examiner* — Erik Mendoza-Wilkenfe
(74) *Attorney, Agent, or Firm* — Linda X. Shi

(57) ABSTRACT

A thermoelectrically cooled container is provided, the thermoelectrically cooled container including a container body have an internal cavity and an outer surface. The container further includes a lid assembly removably connected to the container body, and a thermoelectric cooling unit associated with the container body. The thermoelectric cooling unit is configured to cool the container body.

13 Claims, 28 Drawing Sheets

THERMOELECTRICALLY COOLED CARAFE AND ASSOCIATED COOLING SYSTEM

CROSS REFERENCE TO RELATED APPLICATION

This application claims the benefit of U.S. Provisional Application Ser. No. 61/906,826, filed Nov. 20, 2013, which is incorporated by reference as if fully set forth herein.

FIELD OF INVENTION

This application is generally related to thermally insulated systems and devices, and more particularly related to a thermoelectric cooling system and a thermoelectrically cooled carafe that may be used therewith.

BACKGROUND

Thermoelectric systems are used in a variety of fields and devices, and operate by the Peltier effect, which creates a heat flux between the junction of two different types of materials. Thermoelectric systems that incorporate a Peltier device can be used for heating or cooling, and can further be used as temperature controllers in a wide range of applications. Unlike other known cooling technologies, such as vapor-compression refrigeration, a thermoelectric cooling element acts as a solid-state active heat pump that does not require any moving parts or circulating liquid. In addition, the small form factor and low maintenance of thermoelectric cooling elements makes them desirable for incorporation into smaller systems and devices, such as consumer products. Thermoelectric cooling elements also have a long life, and can be easily controlled by changing the input voltage/current. However, thermoelectric cooling systems are not widely used for refrigeration because of lower efficiency as compared to conventional compression cycle systems.

Thermally insulated carafes, such as pitchers, mugs, cups, and other containers are well known in the industry of consumer products, and are used to keep the contents of the carafe at a constant temperature, generally to preserve warmth or coolness. The thermal insulation of such carafes may be achieved in various ways. For example, some carafes utilize a thicker wall, often made out of a material with low thermal conductivity such as glass, porcelain, earthenware, or ceramics, to minimize heat transfer between the contents and the outside environment. Other carafes include a double-wall exterior, where air is trapped between the inner and outer walls of the carafe and acts as an insulator. Alternatively, the air between the inner and outer walls of the carafe may be evacuated while the walls are joined together to form a near-vacuum within the walls, which prevents heat transfer by conduction or convection. To further preserve the temperature of its contents, many carafes are actively heated or cooled by an associated system. For example, the carafe of coffee makers is often set on a hot plate to continuously warm the contents of the carafe.

The need to maintain the temperature of a carafe's contents is especially important where the carafe is used to hold a consumable liquid, such as a beverage. Many consumers enjoy cold and hot beverages such as coffee, tea, juice, cocktails, and water at a specific temperature range, and often consume such beverages over an extended amount of time. Thermally insulated carafes are often used to keep such beverages warm or cool during the course of consumption, but the effectiveness of known thermally insulated carafes are not always sufficient, especially where the contents of the carafe must be maintained at a substantially constant temperature for more than a few hours.

For example, many coffee and tea drinkers prefer fresh milk or cream in their beverage instead of a powdered creamer, but often go without due to the absence of this perishable beverage. Cafes and coffee shops often provide thermally insulated carafes, such as the double-walled carafes and vacuum carafes discussed above, which can keep dairy products like milk and cream cold for several hours. Keeping dairy products at a sufficiently low temperature is imperative for preventing the growth of potentially harmful bacteria, and to keep the dairy product from spoiling. The staff of cafes and coffees shops must constantly monitor the temperature of these carafes containing dairy products, refill them as they run out, and refrigerate or discard any excess that was not used during business hours. Furthermore, in settings like the home, office, hotel, or other areas with coffee and tea stations, there is often no staff available to manage the station on a full time basis. Many of these coffee and tea stations also do not have a kitchen area or refrigerator in which to keep dairy products. Accordingly, these beverage stations often offer non-dairy creamer that have a long shelf life and require no refrigeration, generally containing powdered hydrogenated vegetable oil, which is an unhealthy and less desirable alternative to fresh dairy products. In such situations, it is desirable to have a small refrigeration device that can maintain consistent cooling of dairy products over a long period of time, such as across day or even weeks.

The above scenario is only one example of why refrigeration may be required on a small scale without the use of large systems like a compression cycle cooling system, which would be unfit for cooling a small device like a carafe. One of ordinary skill in the art would appreciate that small-scale refrigeration may be used in a wide variety of applications across different industries. While there currently exists some thermoelectric cooling devices for purposes of food and beverage refrigeration, these devices have drawbacks in their inefficiency, as well as the need for an appropriate thermal management system, generally a heat sink and fan that results in large and aesthetically unpleasing designs. Therefore, a need exists for a thermoelectric cooling system that has a small form factor, high efficiency, a compact yet efficient thermal management system, is cost effective, and can be incorporated into devices in an aesthetically pleasing manner. Such a thermoelectric cooling system may be used in conjunction with a thermally insulated carafe to provide consistent cooling of the carafe's contents over a long period of time without user intervention. A need further exists for a thermoelectrically cooled carafe that is aesthetically pleasing, compact, and an economic option for the consumer. A need further exists for a beverage carafe lid that minimizes buildup as the beverage is poured, is easy to disassemble and clean, and is aesthetically pleasing.

SUMMARY

A thermoelectrically cooled container is disclosed, the container having a container body with an internal cavity and an outer surface, a lid assembly removably connected to the container body, and a thermoelectric cooling unit associated with the container body. The thermoelectric cooling unit being configured to cool the container body.

A thermoelectric cooling apparatus is also disclosed, the thermoelectric cooling apparatus having a cold plate, a heat sink associated with the cold plate, and a Peltier element associated with the cold plate and the heat sink. The heat sink includes one or more fins that extend in an axial direction. The thermoelectric cooling apparatus further includes a fan arranged below the fins of the heat sink along the axial direction, and a body arranged around the fan. The fan has blades that spin in a circumferential direction, and is configured to move air with respect to the one or more fins of the heat sink in a radial direction that is substantially perpendicular to the axial direction.

A lid assembly for a container adapted to hold a liquid therein is also disclosed, the lid assembly includes an outer lid component configured to be removably connected to an opening of the container, the outer lid component having a circumferential sidewall that extends in an axial direction, and a handle and spout that are each associated with the sidewall. The lid assembly further includes an inner lid component that is arranged concentrically with respect to the outer lid component and configured to be removably connected to the outer lid component, the inner lid component having a circumferential sidewall that extends in an axial direction. The lid assembly also includes a locking mechanism that is arranged on at least one of the sidewall of the outer lid component or the sidewall of the inner lid component.

A method of thermoelectrically cooling the contents of a container is also disclosed. The method includes the steps of providing a container having an internal cavity configured to hold a liquid therein, and providing a thermoelectric cooling unit. The thermoelectric cooling unit includes a cold plate, a Peltier element associated with the cold plate, a heat sink associated with the Peltier element, the heat sink having a plurality of fins that extend along an axial direction, a fan arranged below the heat sink, and a body arranged around the fan. The method further includes the steps of removably associating the container with the thermoelectric cooling unit, and selectively activating the thermoelectric cooling unit and powering the Peltier element to transfer heat from the cold plate to the heat sink. The fan is powered to draw air from an exterior of the thermoelectric cooling unit through the fins of the heat sink inwardly along a radial direction that is substantially perpendicular to the axial direction, and expelling the air downwardly along the axial direction and outwardly along the radial direction from an interior of the thermoelectric cooling unit to the exterior. The method also includes the step of selectively shutting down the thermoelectric cooling unit to discontinue power to the Peltier element and the fan.

For sake of brevity, this summary does not list all aspects of the present application, which are described in further detail below.

BRIEF DESCRIPTION OF THE DRAWINGS

The foregoing summary, as well as the following detailed description of the preferred embodiments of the present application, will be better understood when read in conjunction with the appended drawings. For the purpose of illustrating the invention, there is shown in the drawings embodiments that are presently preferred. It should be understood, however, that the inventions are not limited to the precise arrangements shown in the drawings.

DETAILED DESCRIPTION OF THE PREFERRED EMBODIMENTS

Figure 1:
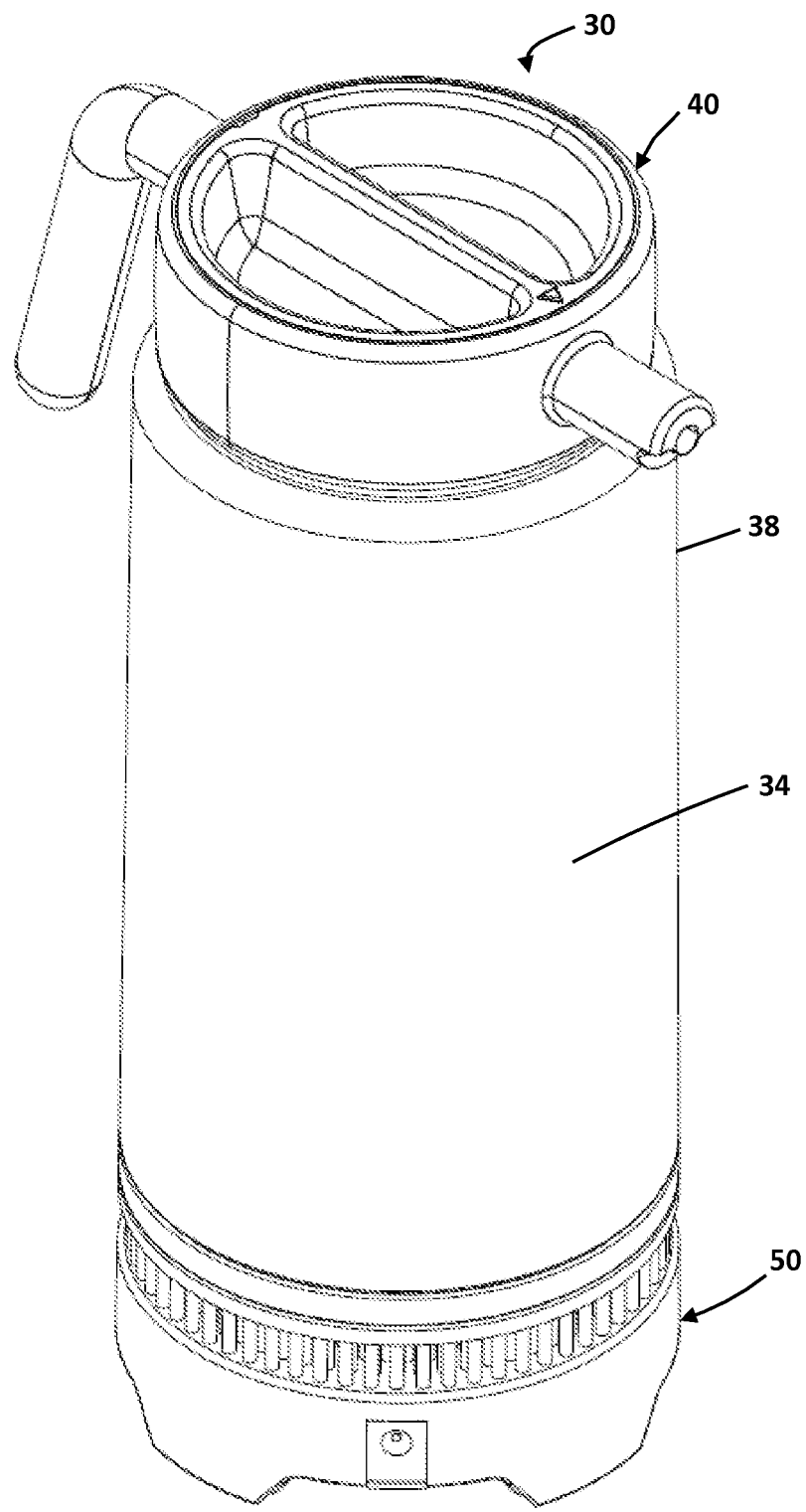
FIG. 1 is a front perspective view of an embodiment of a thermoelectrically cooled container.

Certain terminology is used in the following description for convenience only and is not limiting. The words "front," "back," "top," "bottom," "inner," "outer," "upper," "lower," "internal," and "external" designate directions in the drawings to which reference is made. The words "upward," "downward," "above," and "below" refer to directions towards a higher or lower position from the parts referenced in the drawings. Additionally, the terms "a" and "one" are defined as including one or more of the referenced item unless specifically noted otherwise. A reference to a list of items that are cited as "at least one of a, b, or c" (where a, b, and c represent the items being listed" means any single one of the items a, b, or c, or combinations thereof. The terminology includes the words specifically noted above, derivatives thereof, and words of similar import.

Figure 2:
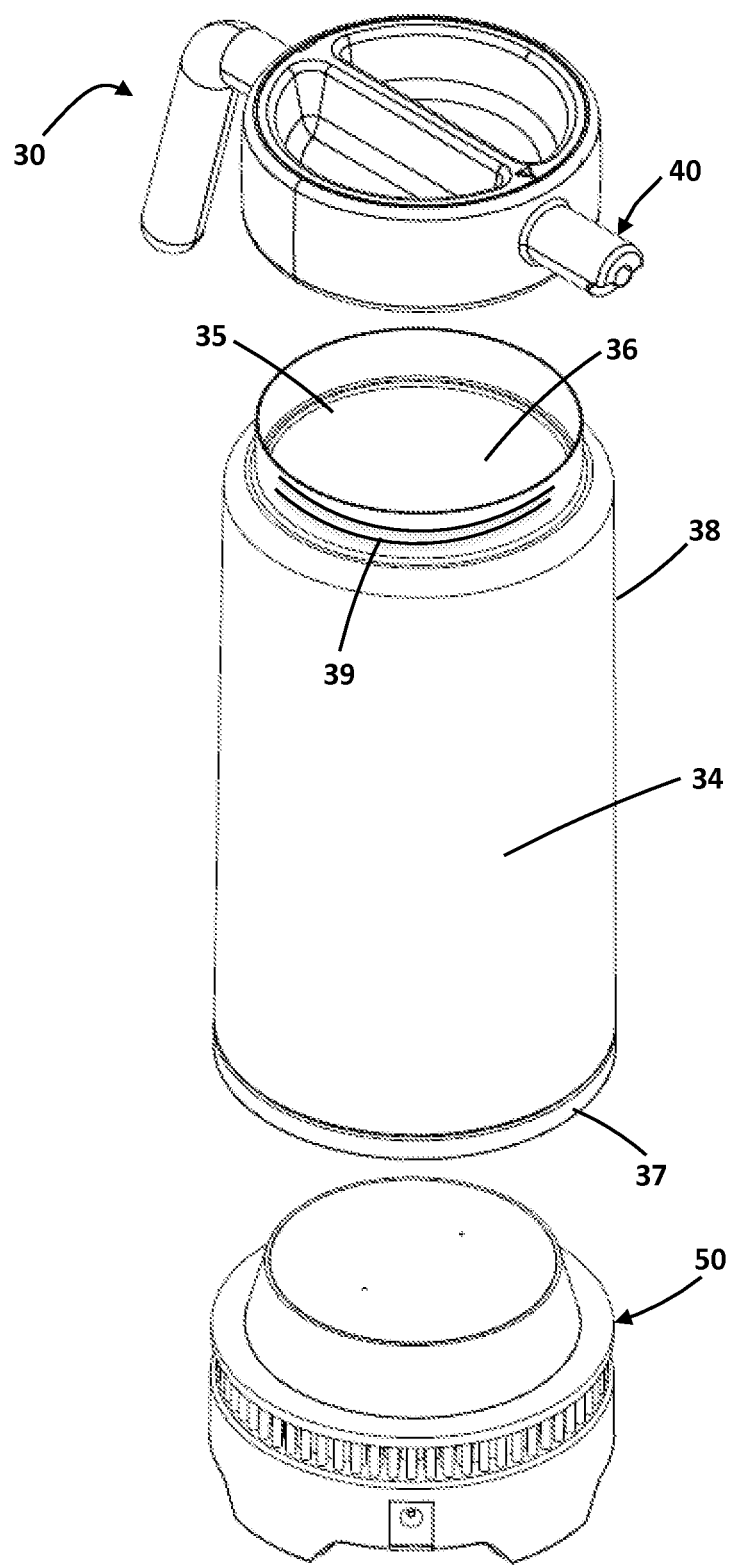
FIG. 2 is an exploded view of the thermoelectrically cooled container shown in FIG. 1.
Figure 3:
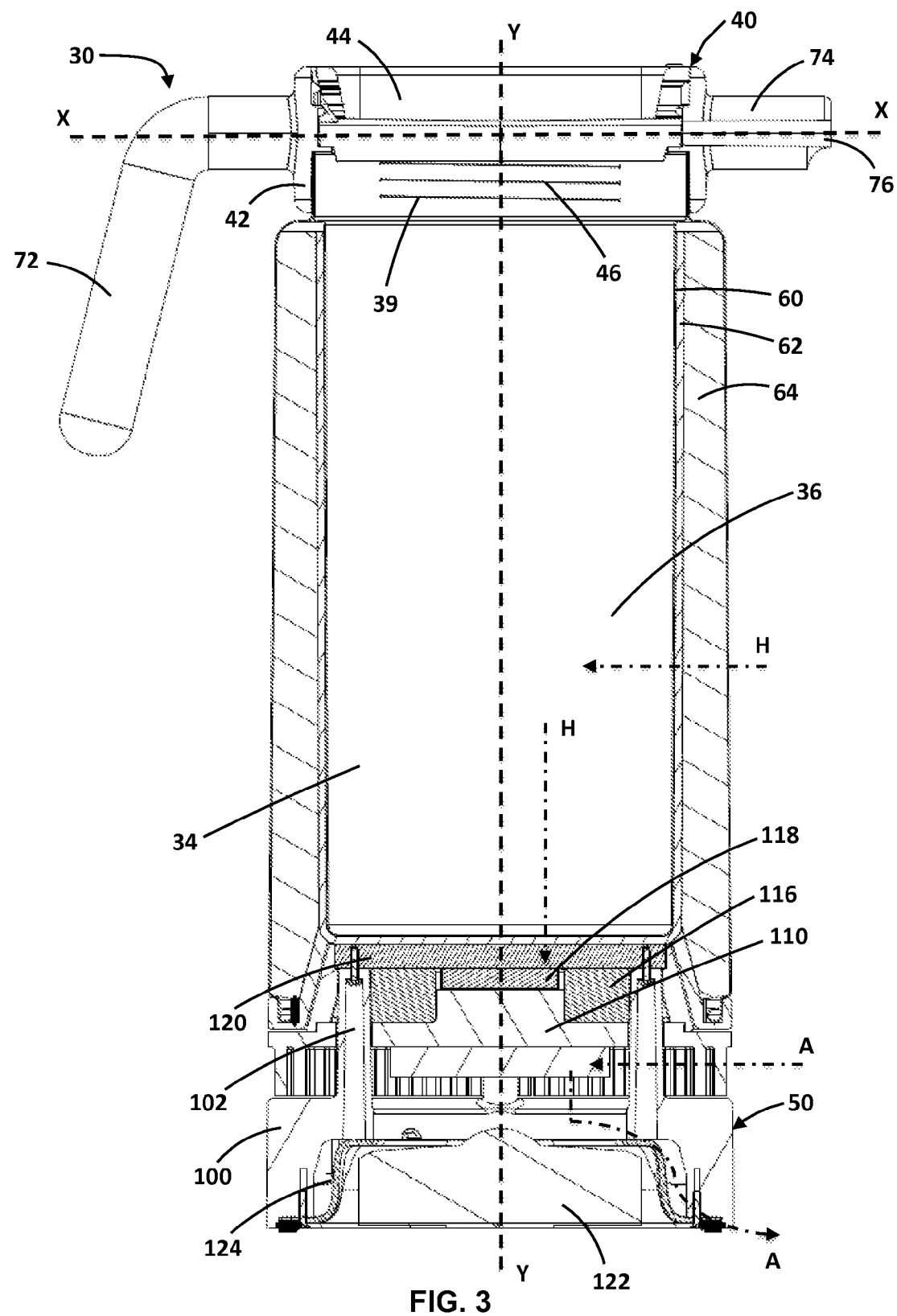
FIG. 3 is a cross-sectional view of the thermoelectrically cooled container shown in FIG. 1, taken along line 3-3 of FIG. 13.

FIGS. 1-3 and 9-15 show an embodiment of a thermoelectrically cooled container 30, which may be used to keep the contents of the container cool for an extended period of time without the use of large or complex refrigeration systems. As shown in FIGS. 1-3, the thermoelectrically cooled container 30 includes a container body 34 having an internal cavity 36 and an outer surface 38, a lid assembly 40 removably connected to the container body 34, and a thermoelectric cooling unit 50 associated with the container body 34. The thermoelectric cooling unit 50 is configured to cool the container body 34, and any of the contents of the container body 34. As shown in FIG. 2, the container body 34 includes an opening 35 that provides access to the internal cavity 36, in which a solid or liquid may be contained, and the lid assembly 40 may be arranged over the opening 35 to close the internal cavity 36. The container body 34 further includes a base 37 arranged opposed from the opening 35, the base 37 being configured to be removably associated with the thermoelectric cooling unit 50.

As discussed above, the container body 34 may be used to store a solid or liquid for which a certain temperature range is to be maintained. The present thermoelectrically cooled container 30 is well suited to maintaining the temperature of a consumable liquid, such as, for example and without limitation, water, coffee, tea, juice, alcohol, or dairy products like milk, half and half, and cream. Although the present embodiment of the thermoelectrically cooled container 30 is configured to cool the contents of the container body 34 to a lower temperature, one of ordinary skill in the art would appreciate that the present system may be configured to heat the contents of the container body 34 instead. With respect to dairy products, the thermoelectrically cooled container 30 is preferably configured to maintain a temperature range of 33-40° F., which prevents the dairy product from spoiling or freezing. Since it is desirable to maintain the contents of the container body 34 within a specific temperature range that is usually different from the ambient temperature, the container body 34 may be thermally insulated. As discussed above, thermal insulation of the container 34 may be achieved in many different ways, such as by material selection, increasing wall thickness, a double-wall construction with air or a near-vacuum container between the two walls, or a combination of the above methods.

Figure 4:
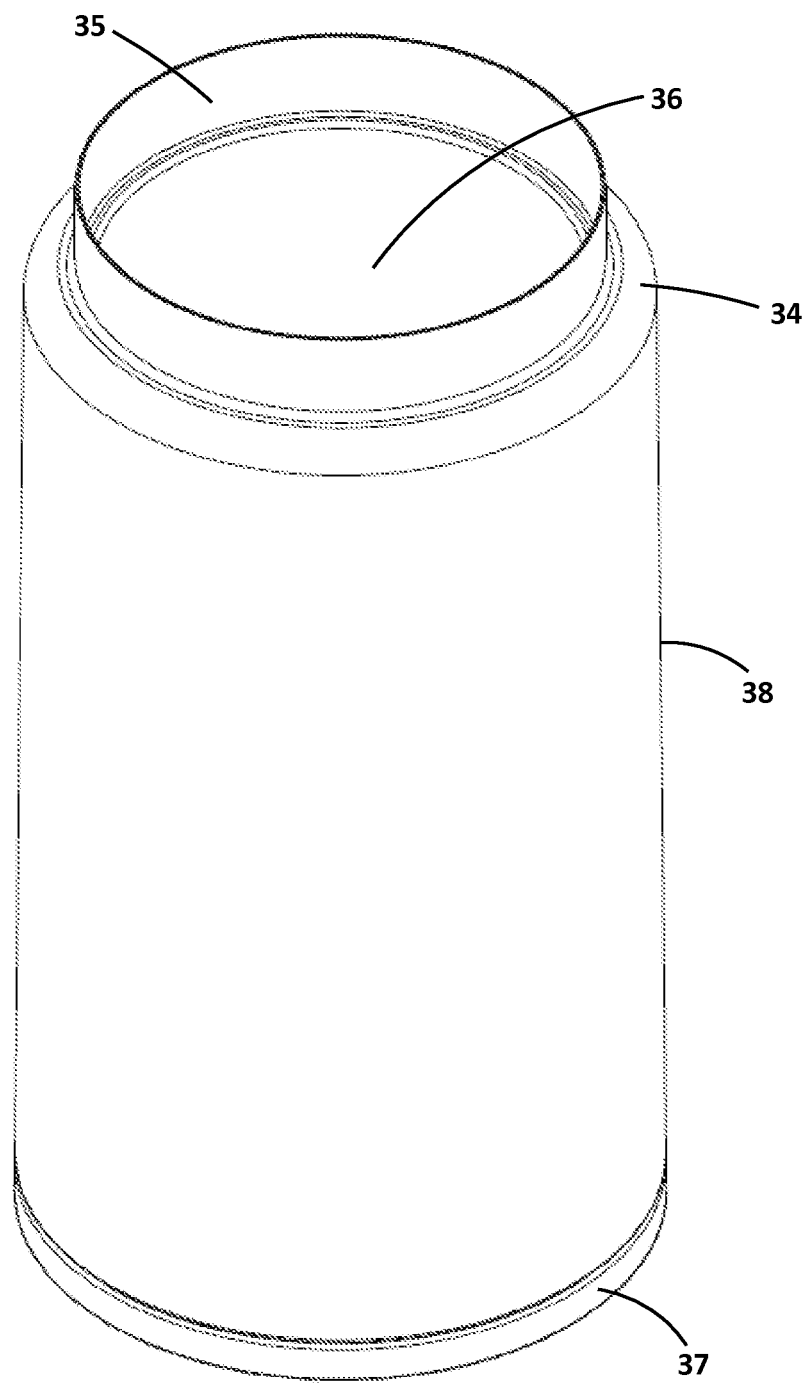
FIG. 4 is a front perspective view of an embodiment of a container body that may be used in the thermoelectrically cooled container shown in FIG. 1.

FIG. 4 illustrates one possible embodiment of the container body 34 with a double-wall construction. As further shown in FIGS. 5-8, the container body 34 may include an inner container 60, a sleeve 62 arranged around the inner container 60, and an outer layer 64 arranged around the sleeve 62. The inner container 60 has an open upper end and a closed lower end, such that a consumable may be stored in the inner container 60. The intermediate sleeve 62 may also have an open upper end and a closed lower end, such that the inner container 60 may be placed into the sleeve 62 through the open upper end and supported by the closed lower end. The outer layer 64 may include both an open upper end and an open lower end, such that the closed lower end of the sleeve 62 may be associated with the thermoelectric cooling unit 50. The sleeve 62 and the outer layer 64 may both be arranged concentrically around the inner container 60. Since the inner container 60 is in direct contact with the consumable stored within the container body 34, the inner container 60 is preferably formed from an inert material that does not react with the contents stored therein, such as stainless steel or ceramic. The internal cavity 36 of the inner container 60 may further include a coating to prevent any reaction between the contents and the material of the inner container, or to prevent the contents from sticking to the internal cavity 36, thus aiding cleaning of the container body 34. For example and without limitation, the coating may be a food-safe hydrophobic material, which allows the contents of the inner container 60 to be poured or otherwise removed from the container body 34 without leaving significant residue behind.

Figure 5:
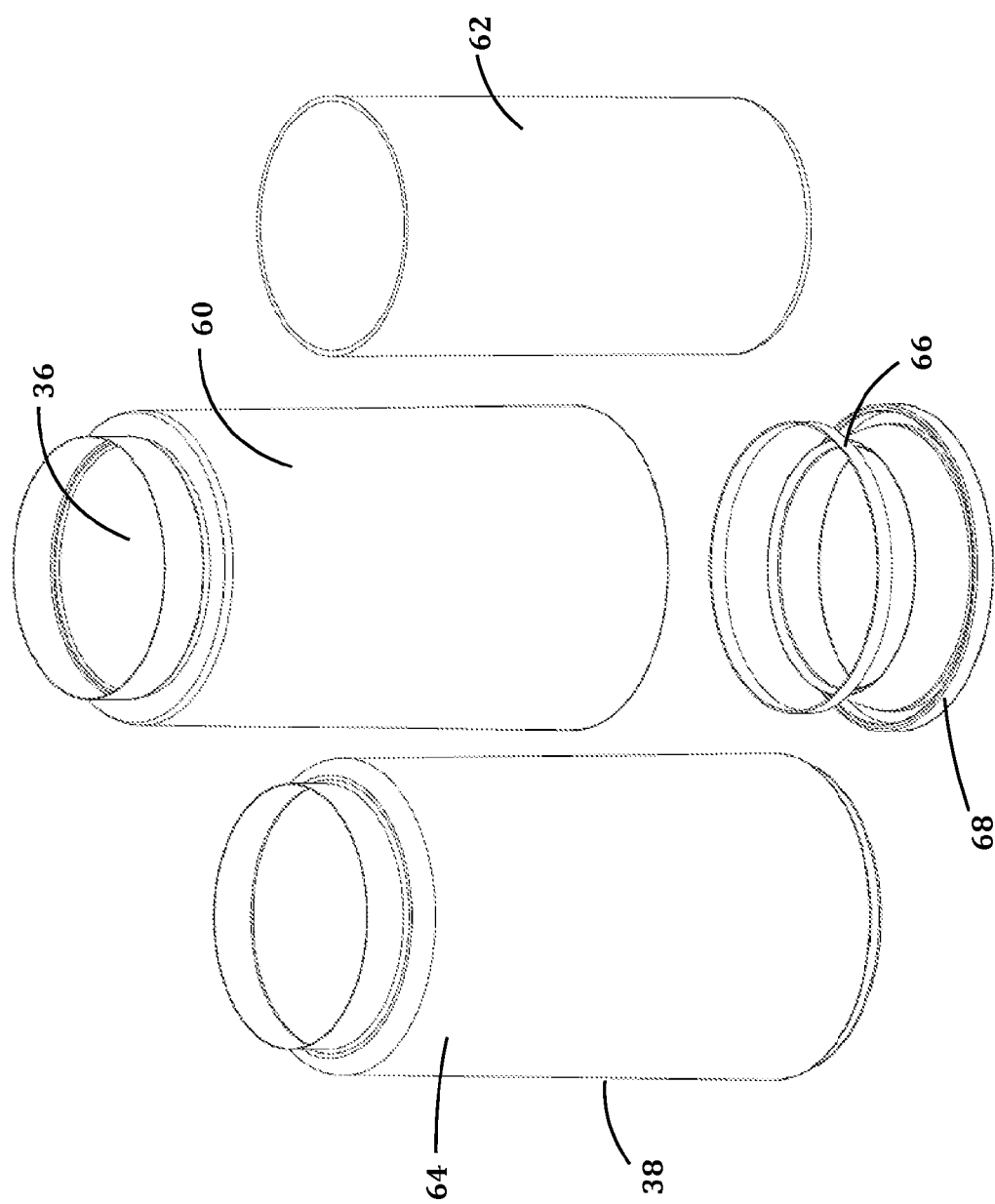
FIG. 5 is an exploded view of the container body shown in FIG. 4.
Figure 6:
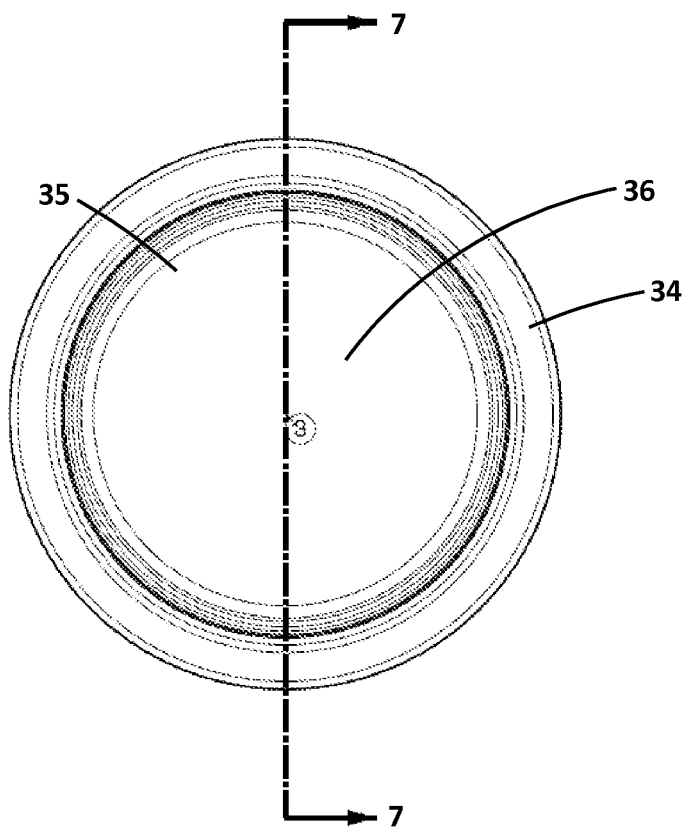
FIG. 6 is a top plan view of the container body shown in FIG. 4.
Figure 8:
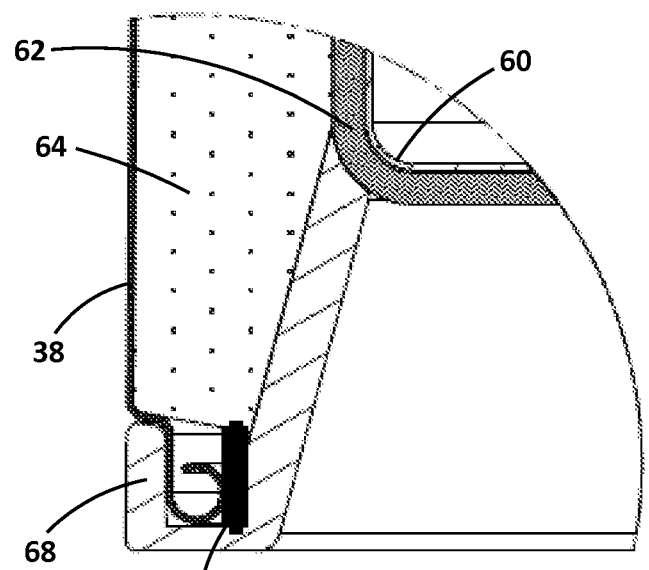
FIG. 8 is an enlarged detail of the area indicated at 8 in FIG. 7.
Figure 7:
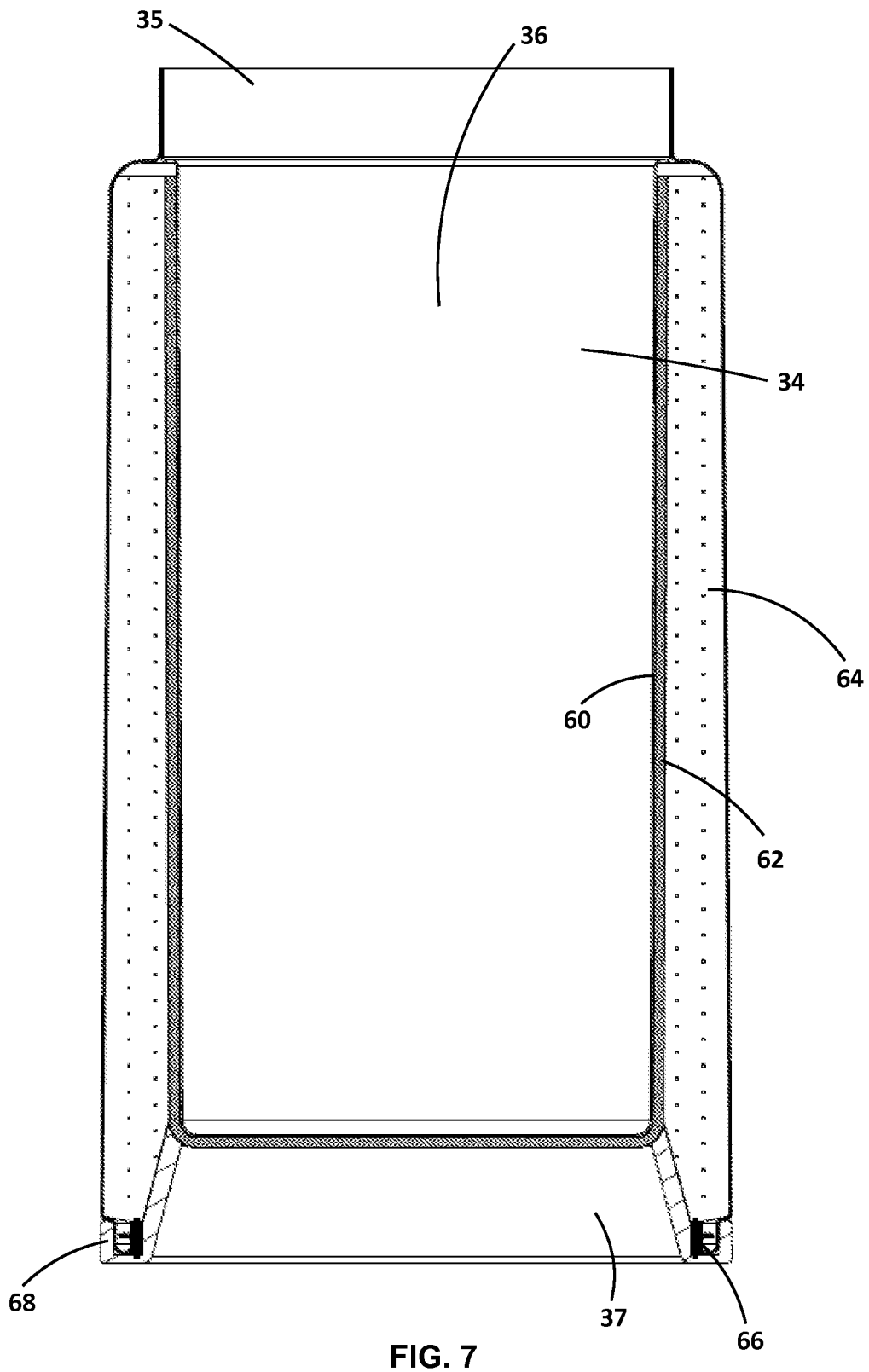
FIG. 7 is a cross-sectional view of the container body taken along line 7-7 of FIG. 6.
Figure 9:
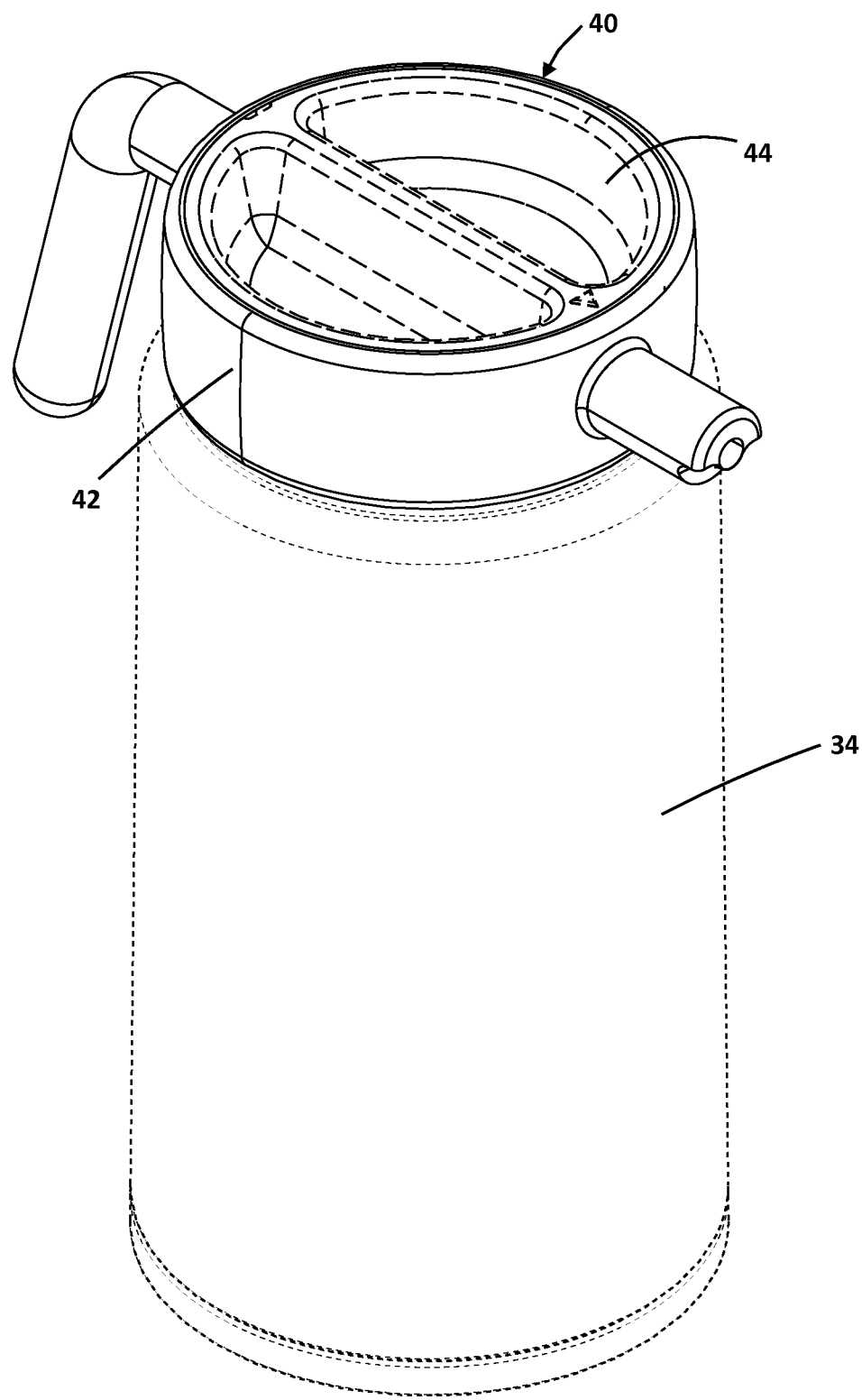
FIG. 9 is another front perspective view of the thermoelectrically cooled container shown in FIG. 1, with certain elements shown in broken lines.
Figure 10:
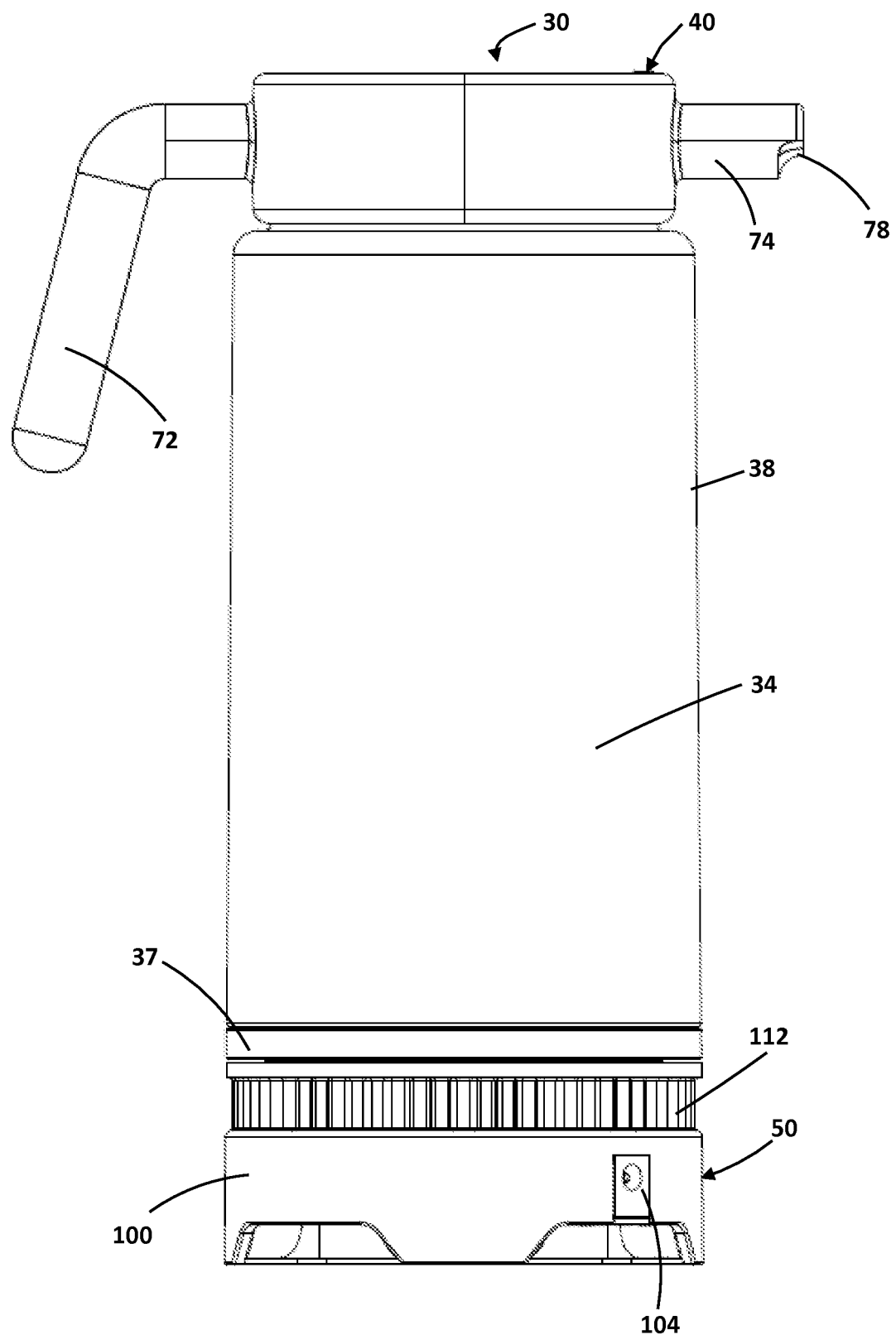
FIG. 10 is a front elevation view of the thermoelectrically cooled container shown in FIG. 1.

The sleeve 62 that surrounds the inner container 60 of the container body 34 is arranged between the inner container 60 and the outer layer 64. The sleeve 62 may be formed from a thermally conductive material so that heat may be easily transferred from the contents in the internal cavity 36 to the inner container 60 and through the sleeve 62 into the thermoelectric cooling unit 50. Furthermore, the sleeve 62 may be formed from a metal of sufficient gauge to prevent thermal stratification of the contents within the inner container 60, where the contents comprise a liquid. For example and without limitation, the sleeve 62 may be formed from aluminum or copper. The inner container 60 and sleeve 62 may be in physical contact with each other to aid heat transfer between the two elements, or may be separated by another layer of thermally conductive material such as a binding material. The outer layer 64, which is arranged around the inner container 60 and sleeve 62, may be formed from a thermally insulating material so that the heat exchange is restricted to the inner container 60, the sleeve 62, and the thermoelectric cooling unit 50. The thermally insulating outer layer 64 also reduces heat exchange between the contents of the container body 34 and the outside atmosphere, and may present an aesthetic outer surface 38 of the container body 34. The outer layer 64 also preferably includes a corrosion-resistive material, so that as the container body 34 is used and cleaned the outer surface 38 does not rust or corrode overtime. For example and without limitation, the outer surface of the outer layer 64 may be formed from ceramic, plastic, stainless steel, or other metal materials. The outer layer 64 may also be formed from several different layers of materials, such as an inner layer of thermally insulating material, such as insulating foam, and an outer layer of metal, ceramic, or plastic material. The outer layer 64 may be in physical contact with the sleeve 62, or may be separated from the sleeve 62 by an air gap or a partial-vacuum, which further improves the thermal insulation of the outer layer 64. As shown in FIGS. 5, 7, and 8, the container body 34 may further include a magnetic component such as a magnetic ring 66 arranged at the lower end of the inner container 60 and sleeve 62, and a closeout bezel 68 arranged below the magnetic ring 66 at the lower end of the outer layer 64. The closeout bezel 68 holds the magnetic ring 66, encloses the bottom of the container body 34 assembly, prevents any sharp edges of the sleeve 62 or outer layer 64 from being exposed, and improves the aesthetic appeal of the base 37 of the container body 34. The magnetic ring 66 may be used to actuate the thermoelectric cooling unit 50, so that when the container body 34 is placed on the thermoelectric cooling unit 50 the thermoelectric cooling unit 50 is activated to begin cooling the container body 34, which will be described in further detail below. The closeout bezel 68 is preferably made from a non-magnetic material such as a plastic or ceramic, as not to interfere with the actuation of the thermoelectric cooling unit 50 by the magnetic ring 66. However, the closeout bezel 68 may also be formed from a metallic material selected and designed to operate with the magnetic ring 66 without affecting actuation of the thermoelectric cooling unit 50.

As discussed above and shown in FIGS. 1-3 and 9-15, the thermoelectrically cooled container 30 includes a lid assembly 40 connected to the container body 34. The lid assembly 40 is preferably removably connected to and arranged over the opening 35 of the container body 34 so that a user can remove the lid assembly 40 to fill or empty the internal cavity 36 of the container body 34, and clean the internal cavity 36 and the lid assembly 40 periodically. The lid assembly 40 also reduces the heat exchange through the opening 35 of the container body 34, and provides a means for the contents of the container body 34 to be easily dispensed by the user. One of ordinary skill in the art would recognize that the lid assembly 40 may take many different forms, only a few possible embodiments of which are described here in detail. For example and without limitation, the lid assembly 40 may be formed as a single component such as a cap that can be removably connected to the opening 35 of the container body 34 through a screw-on connection, a snap fit, a force fit, or other appropriate means well known in the art. However, a single cap configuration would require the user to remove the entire lid assembly 40 in order to pour the contents of the internal cavity 36 from the container body 34, and then replace the lid assembly 40 after each use, which can prove bothersome and inconvenient over time. Accordingly, it may be desirable to form the lid assembly 40 to allow easy selective communication between the internal cavity 36 of the container body 34 and the outside environment. Once again, one of ordinary skill in the art would appreciate that there are many different methods of achieving this goal, such as by forming a small opening in the lid assembly 40 in the form of a sprout, and selectively opening and closing that opening via an actuation mechanism built into the lid assembly 40. For example and without limitation, the lid assembly 40 may include an opening that can be selectively opened or closed by sliding a barrier over the opening, pivoting a barrier over the opening, by using a trigger located near the handle, or any other appropriate means. However, each one of these methods has downsides, such as requiring a large number of moving components, increasing the complexity of the lid assembly 40, and resulting in small spaces in which the contents of the container body 34 may become trapped leading to difficulties in cleaning, odors, and bacteria growth.

Figure 16:
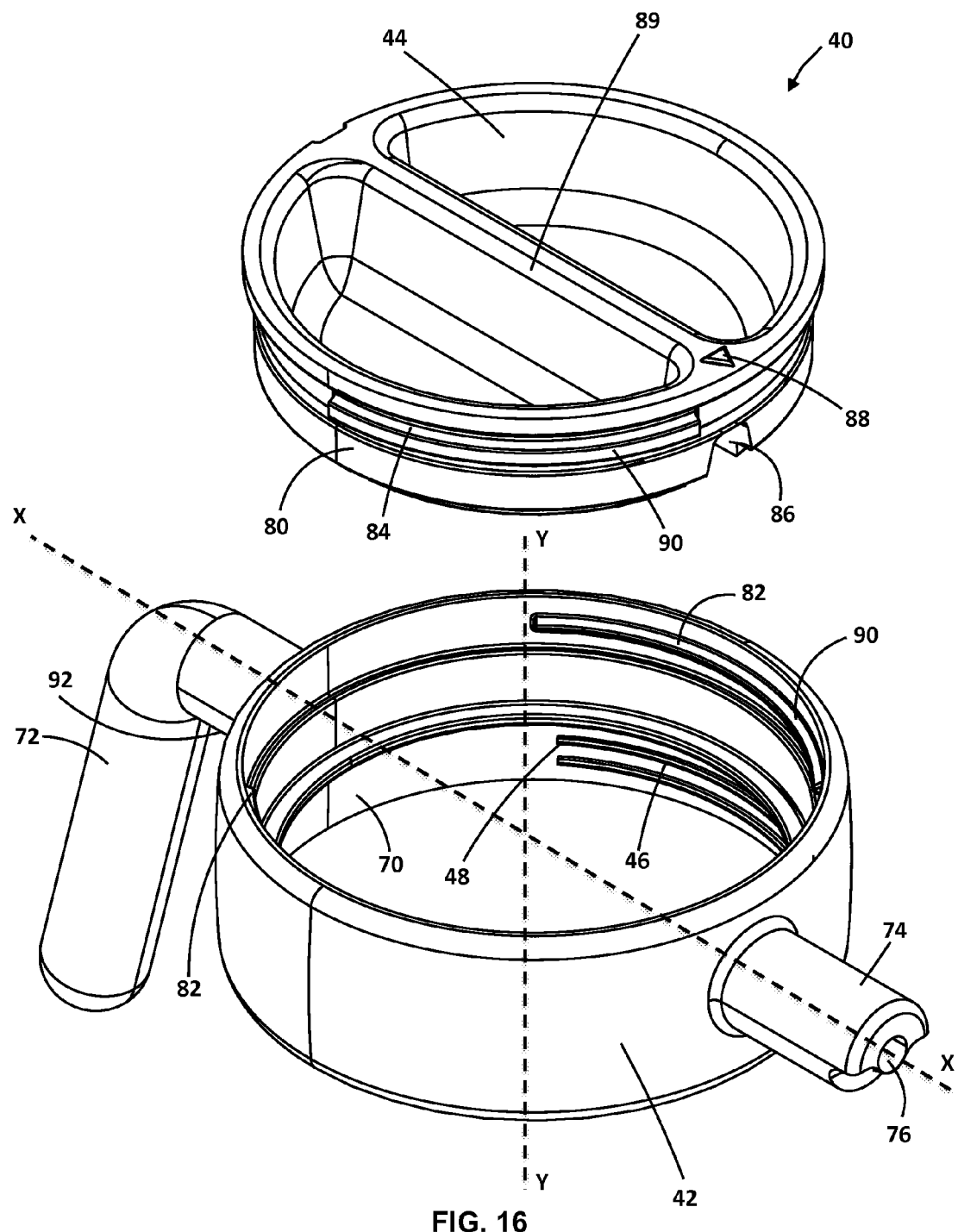
FIG. 16 is an exploded view of a lid assembly that may be used in the thermoelectrically cooled container 30 shown in FIG. 1.
Figure 17:
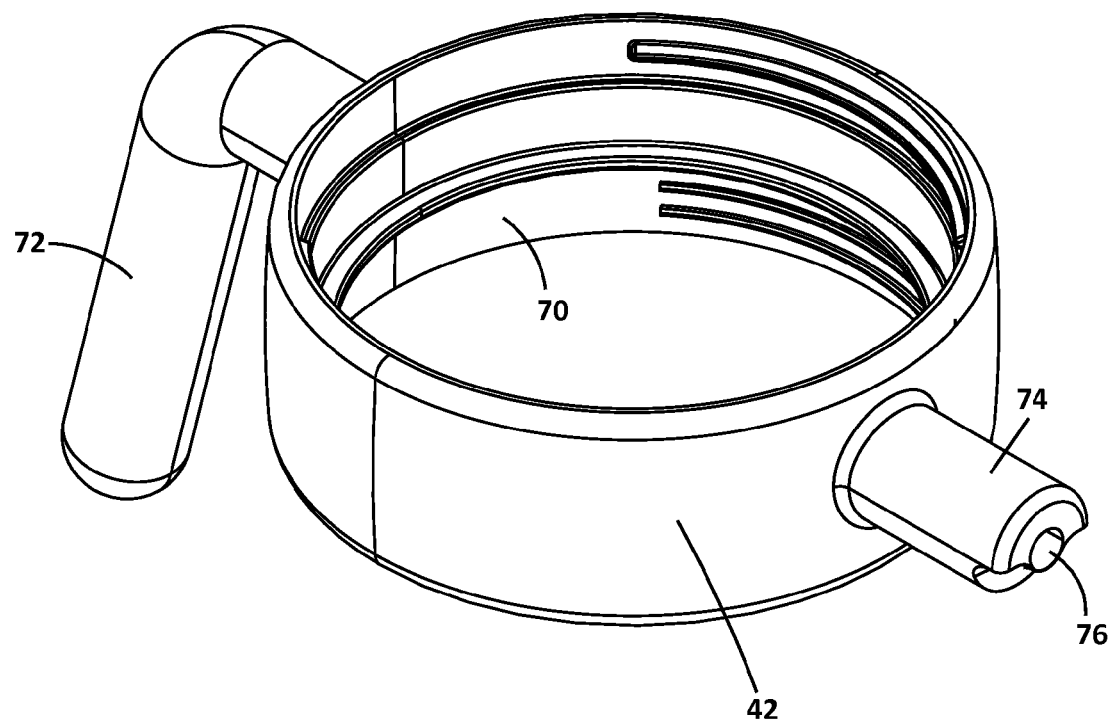
FIG. 17 is a front perspective view of an outer lid component of the lid assembly shown in FIG. 16.
Figure 18:
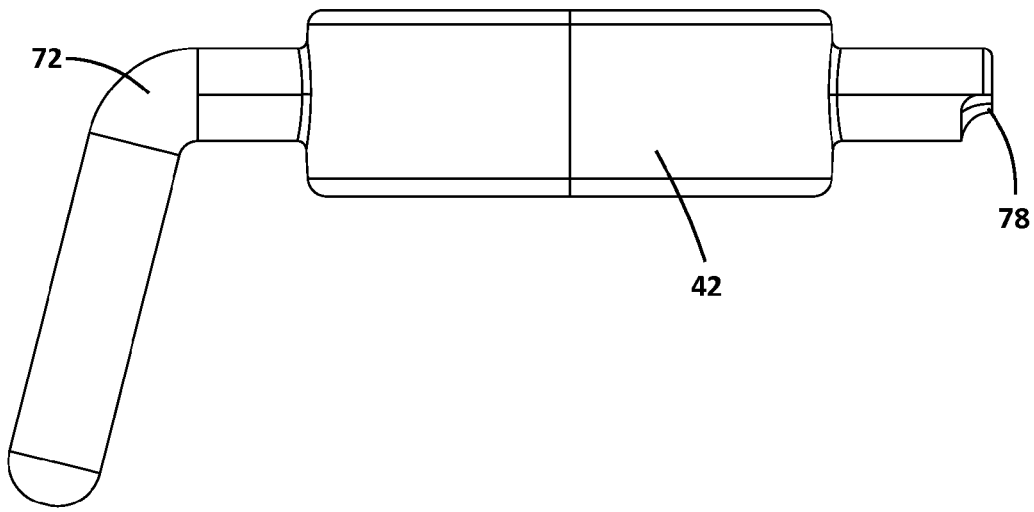
FIG. 18 is a front elevation view of the outer lid component shown in FIG. 17.
Figure 19:
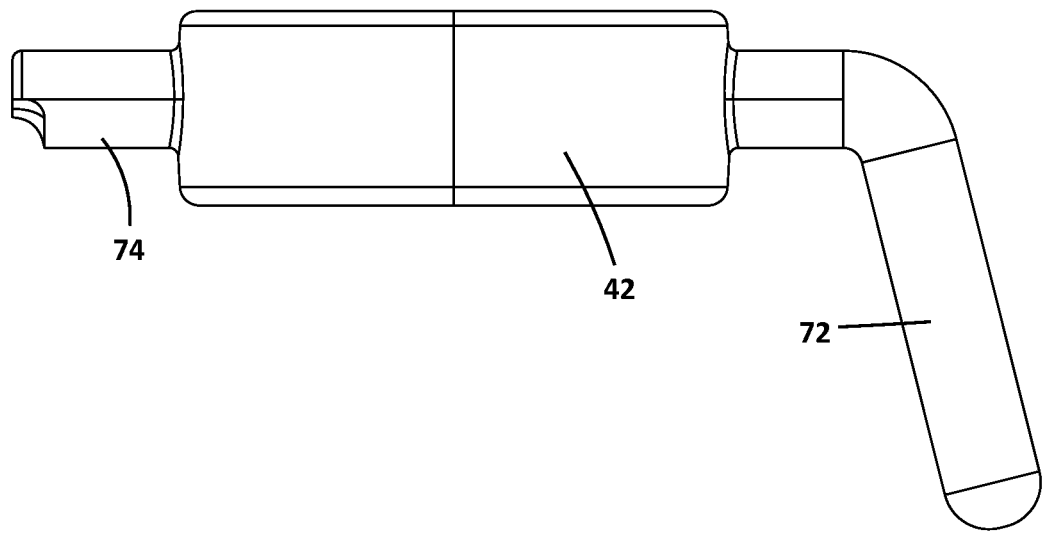
FIG. 19 is a back elevation view of the outer lid component shown in FIG. 17.
Figure 20:
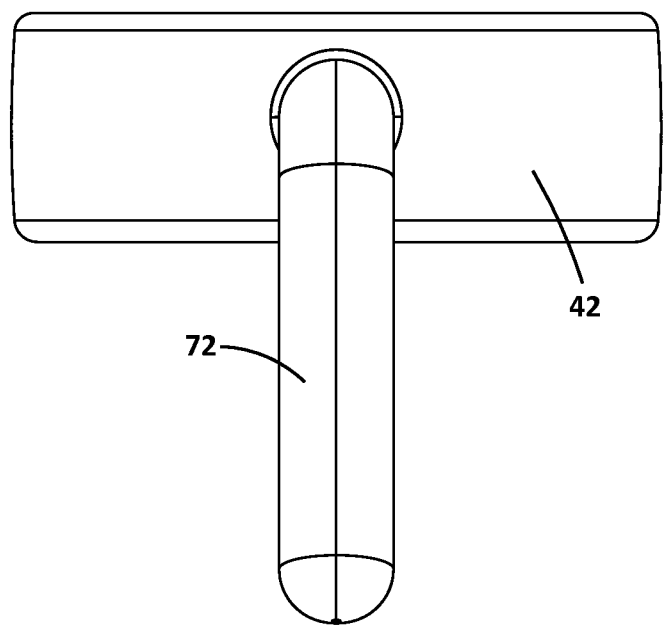
FIG. 20 is a left elevation view of the outer lid component shown in FIG. 17.
Figure 21:
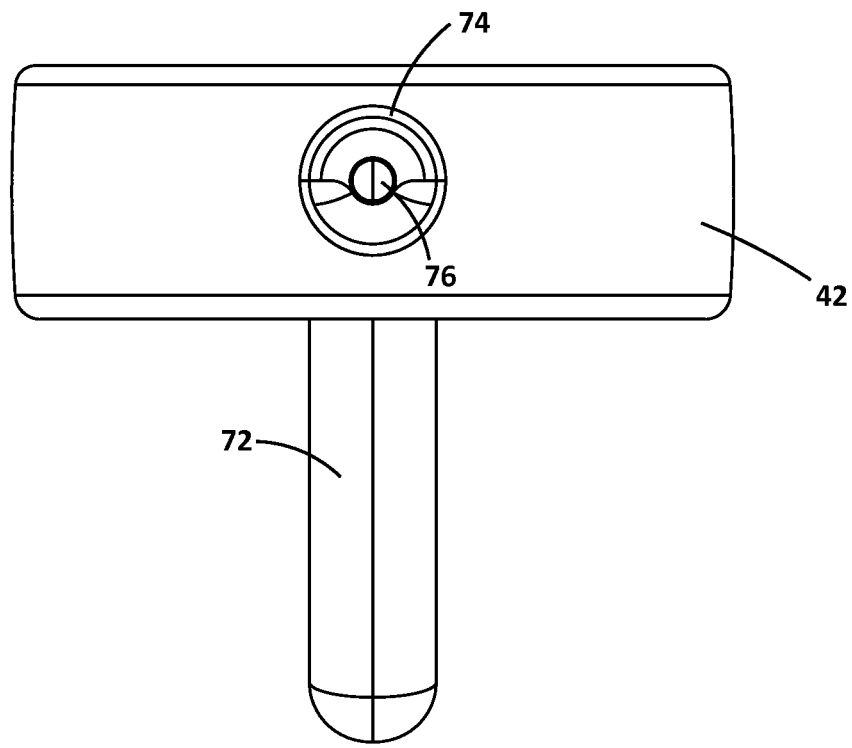
FIG. 21 is a right elevation view of the outer lid component shown in FIG. 17.
Figure 22:
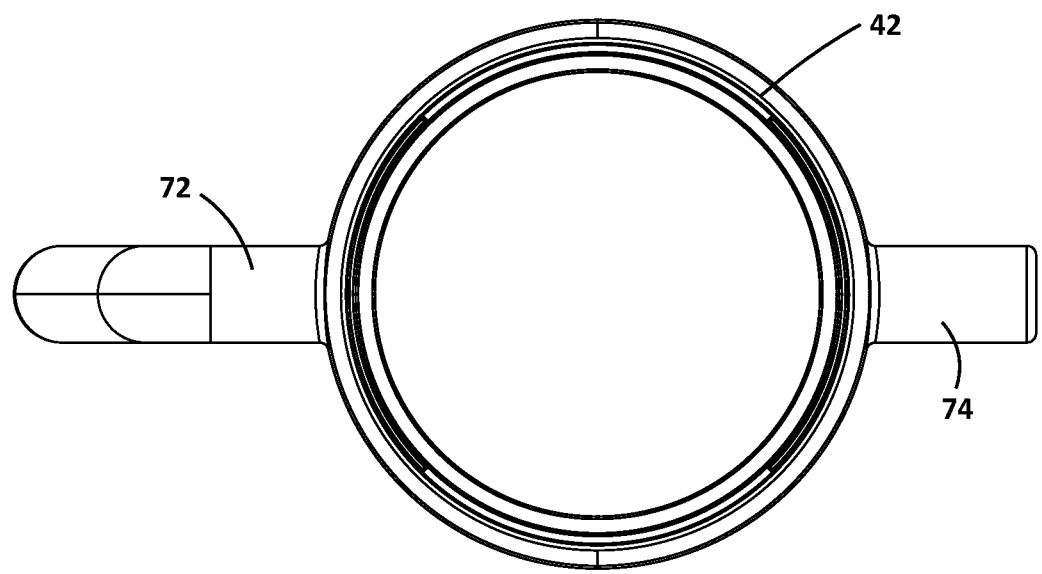
FIG. 22 is a top plan view of the outer lid component shown in FIG. 17.
Figure 23:
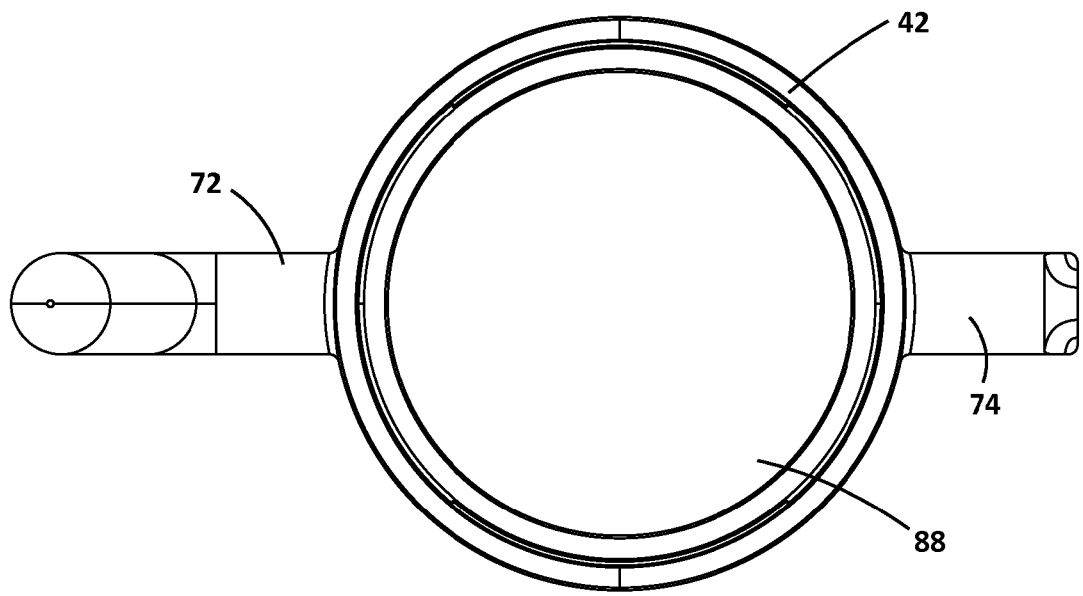
FIG. 23 is a bottom plan view of the outer lid component shown in FIG. 17.

FIG. 16 shows an embodiment of a lid assembly 40 that may be used with the present thermoelectrically cooled container 30 and addresses the issues discussed above by providing a selectively opened or closed lid assembly 40 that has a minimum number of moving parts and can be easily cleaned. As shown in FIG. 16, the present lid assembly 40 includes an outer lid component 42 configured to be removably connected to the container body 34, and an inner lid component 44 configured to be removably connected to the outer lid component 42. The outer lid component 42 may be removably connected around the opening 35 of the container body 34 via an attachment mechanism 48. The attachment mechanism 48 may provide the desired removable connection in a number of ways, such as via a screw-on connection, a snap on connection, a force fit, or other appropriate means. For example and without limitation, an inner surface of the outer lid component 42 may include a bottom thread 46 configured to be removably associated with an opening thread 39 formed on the outer surface 38 of the container body 34 around the opening 35, as shown in FIGS. 2 and 3. As shown in FIGS. 9 and 16-32, the outer lid component 42 may include a circumferential sidewall 70 that extends in an axial direction along the longitudinal axis Y-Y shown in FIGS. 3 and 16. The circumferential sidewall 70 may include a handle 72 and a spout 74 that are each associated with the circumferential sidewall 70. The handle 72 and the spout 74 are preferably arranged opposite from each other, so that a user can easily pick up the container body 34 by grasping the handle 72 and tilting the container body 34 to pour its contents out through the spout 74, which includes an opening 76 that is in communication with the internal cavity 36 of the container body 34. As shown in FIG. 3, the opening 76 may be formed as a through hole in the spout 74 that extends in a radial direction along the transverse axis X-X shown in FIGS. 3 and 16, the radial direction being substantially perpendicular to the axial direction.

As shown in FIGS. 1-3, 9, 16, and 27-31, the lid assembly 40 further includes an inner lid component 44 configured to be removably connected to the outer lid component 42. The inner lid component 44 also includes a circumferential sidewall 80 that extends in the axial direction Y-Y. When the inner lid component 44 is connected to the outer lid component 42, the inner and outer lid components 44, 42 are preferably arranged concentrically with respect to each other. As shown in FIG. 16, a locking mechanism 90 may be arranged on at least one of the circumferential sidewall 70 of the outer lid component 42 or the circumferential sidewall 80 of the inner lid component 44. One of ordinary skill would recognize that this locking mechanism 90 may be formed in a wide variety of ways to achieve a removable connection between the inner and outer lid components 42, 44 that is substantially watertight, such as for example and without limitation, a screw-on connection, a snap on connection, a force fit, each of which may be enhanced by other components such as gaskets. In the present embodiment of the lid assembly 40, the locking mechanism 90 includes a bayonet connection formed between the outer lid component 42 and the inner lid component 44, which allows the inner lid component 44 to be removed entirely from the outer lid component 42 when desired, and then connected to the outer lid component 42 to close the internal cavity 36 of the container body 34 from the exterior environment when desired. This bayonet connection may be achieved by forming a groove on one of the circumferential sidewalls 70, 80 of the outer lid component 42 or the inner lid component 44, and forming a corresponding flange on the other one of the circumferential sidewalls 70, 80 of the outer lid component 42 or the inner lid component 44, the flange being configured to be received within the groove. In the specific embodiment of the lid assembly 40 shown in FIG. 16, the locking mechanism 90 includes two separate flanges 82 formed on an inner surface of the circumferential sidewall 70 of the outer lid component 42, the two flanges 82 being arranged circumferentially opposite from each other. The locking mechanism 90 further includes two corresponding grooves 84 formed on an outer surface of the circumferential sidewall 80 of the inner lid component 44, the two grooves 84 also being arranged circumferentially opposite from each other and configured to each selectively engage one of the two flanges 82. Although two flanges 82 and two grooves 84 are used in this embodiment of the lid assembly 40, one of ordinary skill in the art would understand that the same locking functions can be achieved by only using one flange 82 and one corresponding groove 84, or by using more than two flanges 82 and corresponding grooves 84. Furthermore, one of ordinary skill in the art would appreciate that the location of the flanges 82 and grooves 84 on the inner and outer lid components 44, 42 can be easily reversed without affecting the function of the locking mechanism 90.

The flanges 82 and grooves 84 of the present lid assembly 40 achieve a bayonet connection that allows the inner lid component 44 to be selectively locked on to or removed from the outer lid component 42. Specifically, the inner lid component 44 is movable between a locked position in which the flange 82 of the locking mechanism 90 is at least partially engaged with the groove 84 of the locking mechanism 90, such that the inner lid component 44 cannot move axially along the longitudinal direction Y-Y with respect to the outer lid component 42, and an unlocked position in which the flange 82 of the locking mechanism 90 is not engaged with the groove 84 of the locking mechanism 90, such that the inner lid component 44 can move axially with respect to the outer lid component 42. In other words, the inner lid component 44 cannot be removed from the outer lid component 42 when in the locked position, and can be removed from the outer lid component 44 when in the unlocked position, such as when the inner lid component 42 is to be cleaned or the internal cavity 36 of the container body 34 to be filled, emptied, or cleaned.

Figure 24:
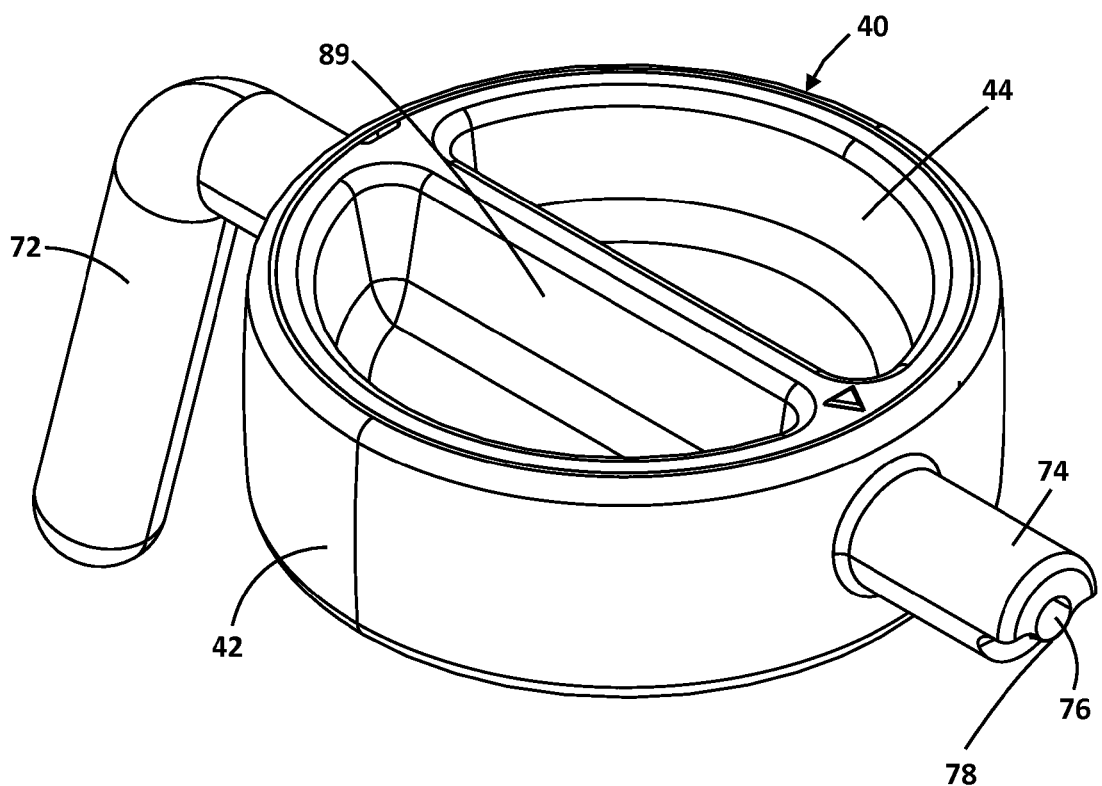
FIG. 24 is a front perspective view of the lid assembly shown in FIG. 16 in an assembled form.
Figure 25:
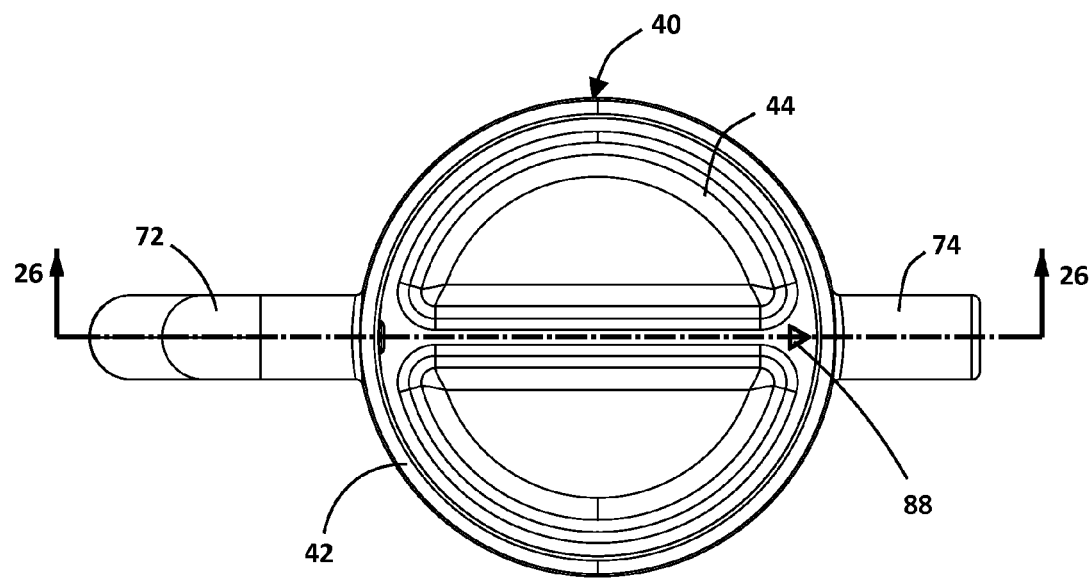
FIG. 25 is a top plan view of the lid assembly shown in FIG. 24.
Figure 26:
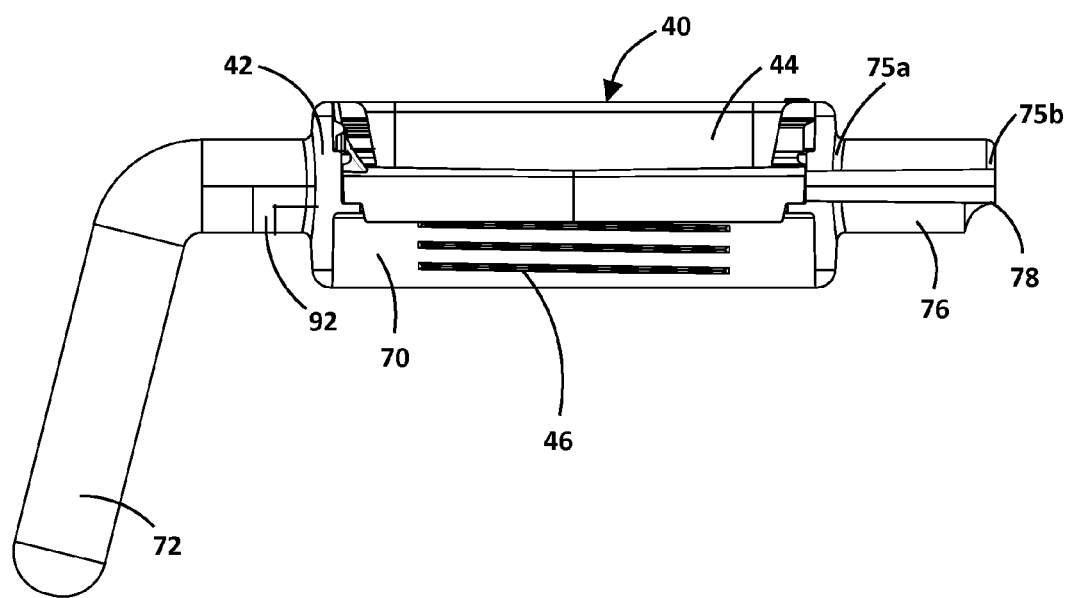
FIG. 26 is a cross-sectional view of the lid assembly taken along line 26-26 of FIG. 25.
Figure 27:
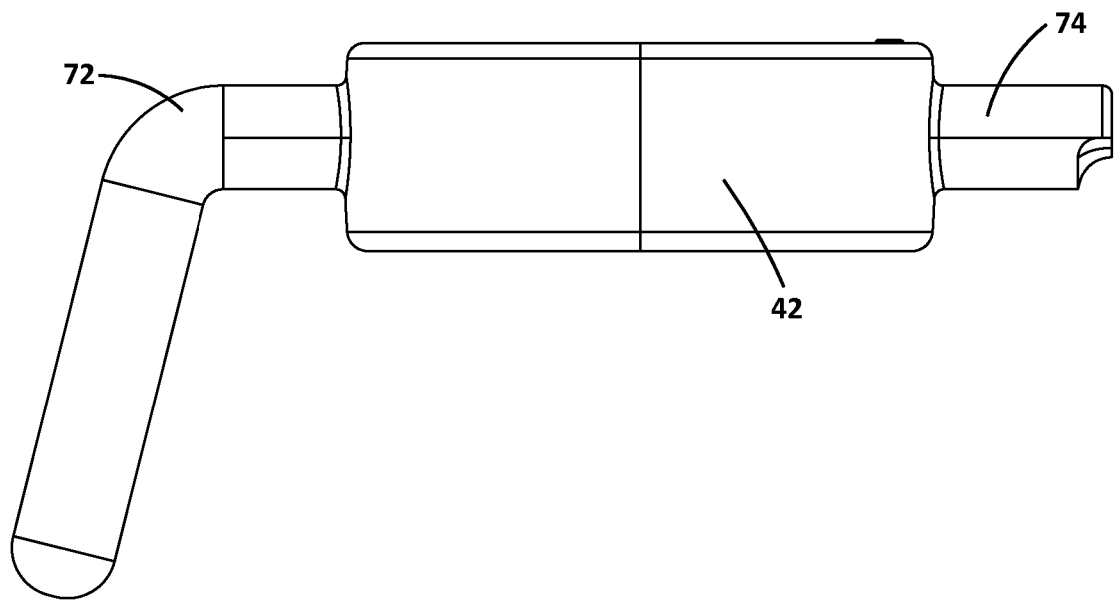
FIG. 27 is a front elevation view of the lid assembly shown in FIG. 24.
Figure 28:
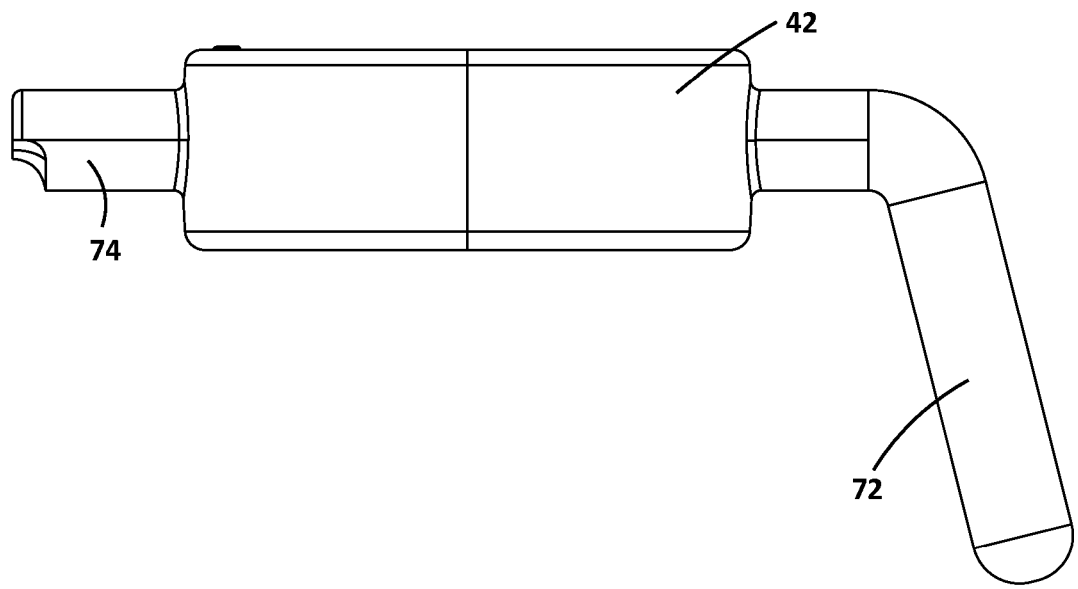
FIG. 28 is a back elevation view of the lid assembly shown in FIG. 24.
Figure 29:
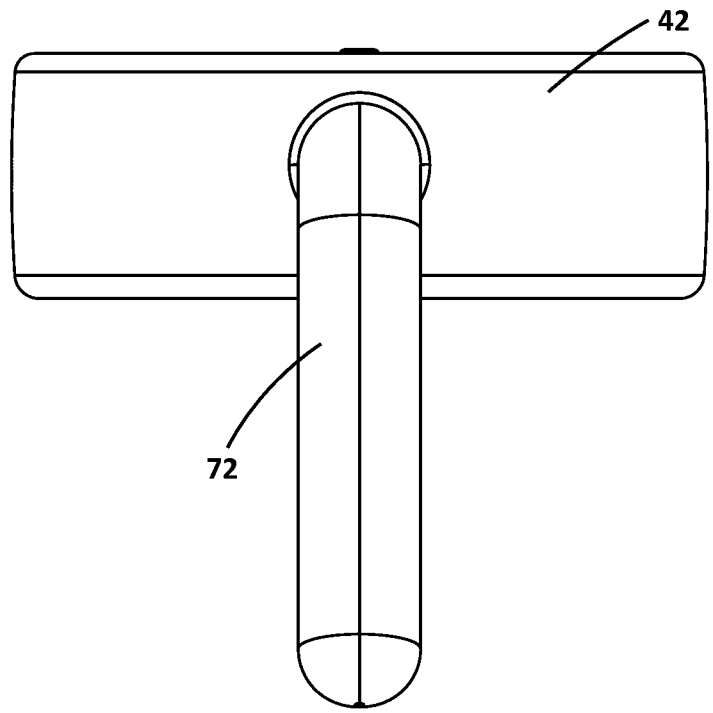
FIG. 29 is a left elevation view of the lid assembly shown in FIG. 24.
Figure 30:
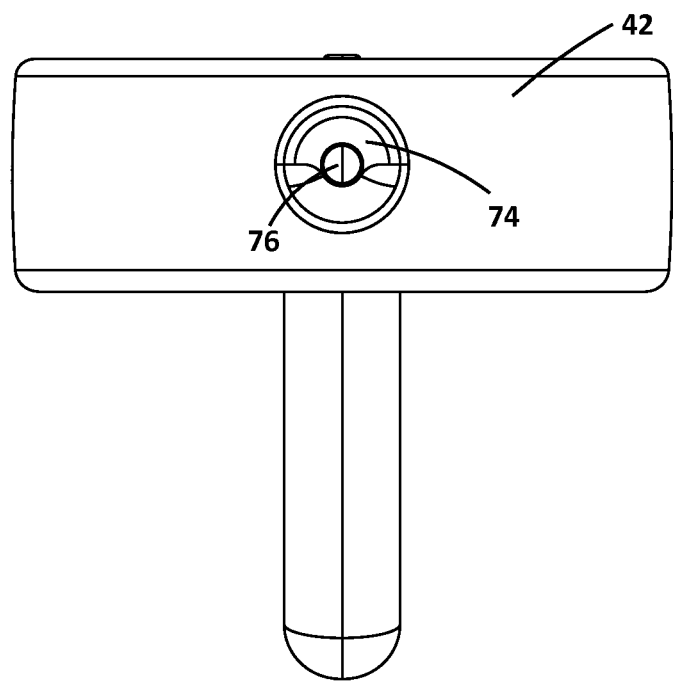
FIG. 30 is a right elevation view of the lid assembly shown in FIG. 24.
Figure 31:
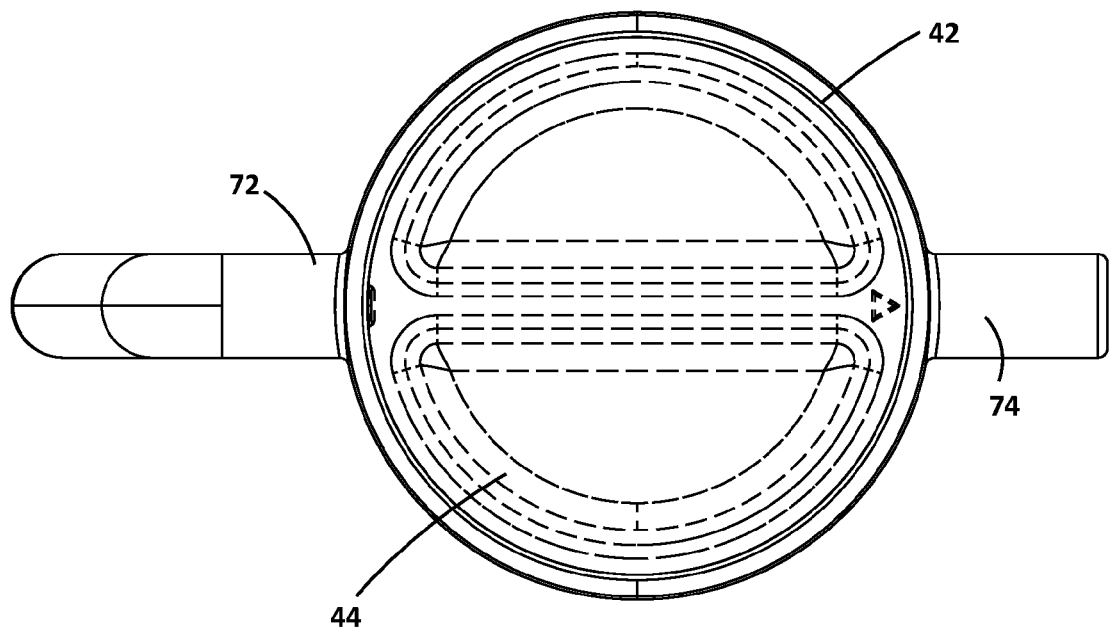
FIG. 31 is a top plan view of the lid assembly shown in FIG. 24, with the inner lid component shown in broken lines.
Figure 32:
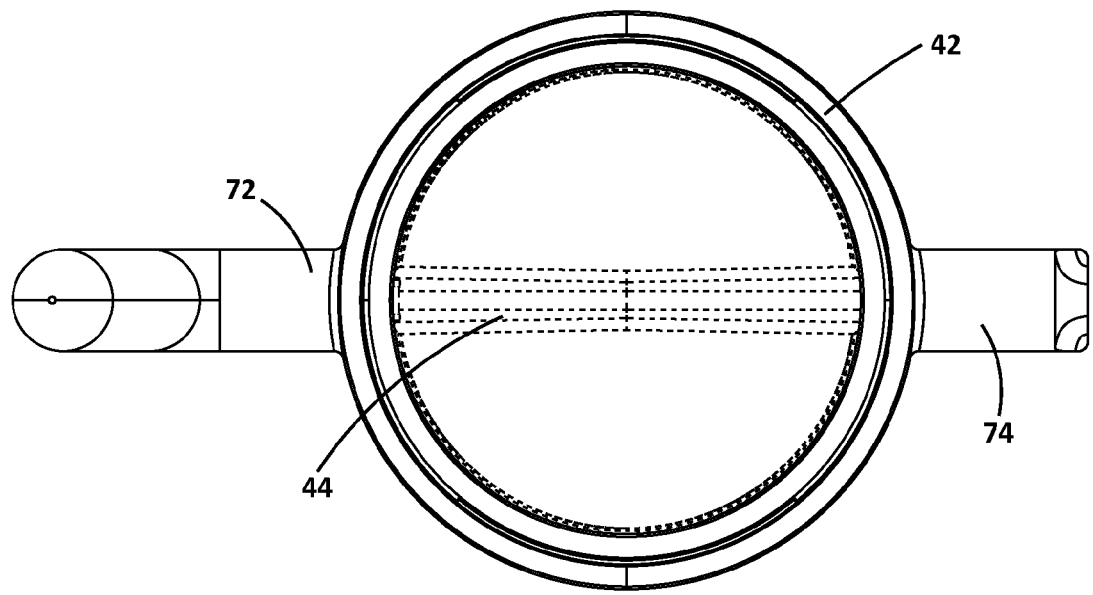
FIG. 32 is a bottom plan view of the lid assembly shown in FIG. 24, with the inner lid component shown in broken lines.

As shown in FIGS. 16 and 24-26, the circumferential sidewall 80 of the inner lid component 44 may include a fluid channel 86 formed therein along the radial direction X-X. The inner lid component 44 is further movable between an open position in which the fluid channel 86 is circumferentially aligned with the through opening 76 in the spout 74 along the radial direction (as shown in FIGS. 24-26), such that a liquid held within the container body 34 can exit through the spout 74, and a closed position in which the fluid channel 86 is not circumferentially aligned with the through opening 76 in the spout 74 along the radial direction, such that the spout 74 is blocked by the circumferential sidewall 80 of the inner lid component 44 and the liquid held within the container body 34 cannot exit through the spout 74. When the lid assembly 40 is connected to the container body 34 and the inner lid component 44 is in the closed position, the lid assembly 40 preferably forms a substantially airtight and watertight such that the contents of the container body 34 cannot be exposed to the external environment even when the container body 34 is moved, shaken, or knocked over.

As shown in FIGS. 1-2, 16, and 24-26, the inner lid component 44 may include a visual indicator 88 that maybe be circumferentially aligned with the fluid channel 86, to aid the user in moving the inner lid component 44 between the open and closed positions. The visual indicator 88 may be a symbol such as an arrow that may be differentiated from the rest of the inner lid component 44 through material selection, color, texture, or any other suitable means. In this manner, the user can easily align the visual indicator 88 with the spout 74 when the user desires to pour the contents of the container body 34 through the spout 74, then twist the inner lid component 44 to the closed position when the pouring operation is complete. To aid the user in moving the inner lid component 44 between the open and closed positions, the inner lid component 44 may include a knob 89 or similar element configured to rotate the inner lid component 44 with respect to the outer lid component 42. As shown in FIG. 16, the knob 89 may be formed as a protrusion that extends transversely along the radial direction and is aligned with the visual indicator 88 and the fluid channel 86, which further aids the user in determining when the inner lid component 44 has been moved to the open position.

To ensure a smooth and efficient pouring operation, the lid assembly 40 may further include an air hole 92 that allows air from the external atmosphere to enter the container body 34 as the contents of the container body 34 is being poured out through the opening 76 of the spout 74. This air hole 92 is desirable because as the liquid contents of the container body 34 are being poured out, the air space within the container body 34 increases and reduces the pressure of the trapped air, beginning the creation of a vacuum, and there is insufficient pressure to push the liquid contents of the container body 34 out through the spout 74. Without the air hole 92, it is possible for outside air to enter through the opening 76 of the spout 74 during the pouring operation, but that would require the opening 76 to be large enough so that air can enter as the contents of the container body 34 is being poured out, and is likely to result in a "glug" action wherein the contents are poured out in spurts between air entering through the opening 76, instead of a smooth flow. By providing the air hole in the lid assembly 40, outside atmospheric air may enter the container body 34 as the liquid contents are being poured out, so that the air pressure within the container body 34 on top of the liquid contents is substantially similar to the air pressure outside of the container body 34, so the force of gravity pulls the liquid contents out through the opening 76 of the spout 74 in a smooth flow. One of ordinary skill in the art would appreciate that the air hole 92 may be formed anywhere on the lid assembly 40, and alternatively may be made on the container body 34 itself, although the latter option may interfere with the insulating properties of the container body 34. For example and without limitation, the air hole 92 may be formed on a bottom surface of the handle 72 of the outer lid component 42, as shown in FIG. 26. In this example, the air hole 92 is formed as a through-hole within the handle 72 such that one end of the air hole 92 is open to the external atmosphere and the other end of the air hole 92 extends through the circumferential sidewall 70 of the outer lid component 42, so that air may travel from the exterior of the container body 34 to the internal cavity 36 when the lid assembly 40 is assembled over the opening 35 of the container body 34 and in the closed position. Placing the air hole 92 on a bottom surface of the handle 72 is advantageous in that dust and other debris is unlikely to enter the container body 34 through the air hole 92, and also in that the air hole 92 is hidden from view during normal use, so that it does not disrupt the overall aesthetic appeal of the thermoelectrically cooled container. Furthermore, the location of the air hole 92 by the handle 72 is circumferentially opposite from the location of the opening 76 of the spout 74, so that airflow into the air hole 92 is unlikely to be interrupted by the liquid contents of the container body 34 exiting through the spout 74.

As further shown in FIGS. 24 and 26-28, the spout 74 includes an inner end 75a connected to the sidewall 70 of the outer lid component 42, and an opposing outer end 75b through which the liquid contents held within the container body 34 may exist. The outer end 75b of the spout 74 may include a sharp edge 78 configured to break the surface tension of any liquid exiting through the opening 76 of the spout 74. As one of ordinary skill in the art would understand, surface tension of liquids is caused by cohesion of similar molecules, and causes liquids to "bead" or form droplets. This effect is commonly seen when pouring liquid out from a container, where there is often some beading or gathering of the liquid around the spout at the end of the pouring operation. In other words, it is often difficult to achieve a "clean pour" without the liquid being poured out leaving residue around the spout or dripping down around the spout, which would require cleanup by the user after each pour. To resolve this issue and ensure a clean pour that minimizes the need for cleanup, the present lid assembly utilizes a spout 74 having a sharp edge 78 created at the bottom of the opening 76 through which the liquid contents of the container body 34 exists. The sharp edge breaks the surface tension of the exiting liquid, so that when the pouring operation is complete no droplets form at the end of the opening 76. This is especially useful when the thermoelectrically cooled container 30 is used to hold a dairy product such as milk or cream, since having milk or cream gather and drip from the opening 76 of the spout 74 is aesthetically unpleasant, can lead to odors and bacteria growth, and is likely to discourage an individual from utilizing the dairy product due sanitary concerns.

The container body 34 and lid assembly 40 described above may be used together with the thermoelectric cooling unit 50 to actively cool the contents of the container body 34, or may be used alone as a thermally insulating carafe or mug. In either case, the container body 34 and lid assembly 40 may be easily filled, refilled, emptied, and cleaned with a minimum number of parts to disassemble and reassemble. For example, the container body 34 may be filled or refilled by removing the entire lid assembly 40 and pouring in the desired contents through the opening 35 of the container body 34. Alternatively, only the inner lid component 44 of the container body 34 may be removed, which still provides a large opening for the desired contents to be poured into the opening 35 of the container body 34. The bayonet connection between the inner lid component 44 and the outer lid component 42 makes it easy to selectively remove the inner lid component 44 from the lid assembly 40. Similarly, when the user desires to clean the container, the container body 34 and lid assembly 40 can be easily disassembled into a mere three pieces, which may then be soaked, rinsed, or washed. The bayonet connection within the lid assembly 40 also ensures that there are no nooks or crevices in which the liquid contents of the container body 34 may become trapped over time, which is especially important for dairy products, since any residual trapped product can spoil and lead to odor and health concerns.

Figure 34:
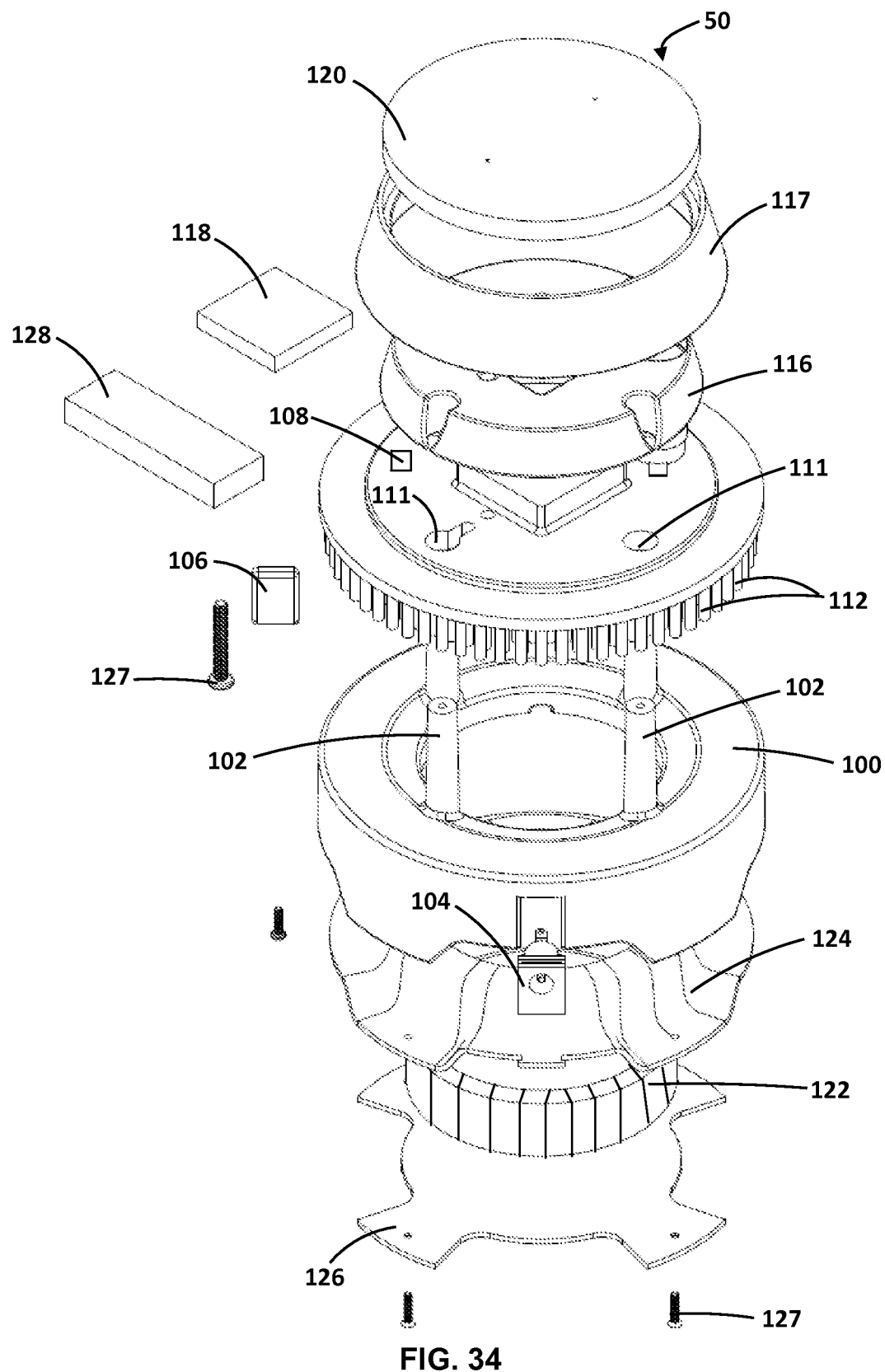
FIG. 34 is an exploded view of the thermoelectric cooling unit shown in FIG. 33.

The present application is also directed to a thermoelectric cooling unit or apparatus 50, as shown in FIGS. 1-3, 10-13, and 33-39, which may be used with the container body 34 and lid assembly 40 discussed above to thermoelectrically cool the contents of the container body 34. The present thermoelectric cooling unit 50 utilizes a Peltier element to provide a solid-state active heat pump that effectively cools the contents of a container that may be removably associated with the thermoelectric cooling unit 50. As shown in FIG. 34, the thermoelectric cooling unit 50 includes a body 100 that provides the majority of the structural support for the entire assembly. Accordingly, the body may be form from any material having the sufficient load-bearing capacity, such as a metal, plastic, composite material, or combination thereof. The body 100 includes a plurality of posts 102, which may be spaced substantially evenly about the circumference of the body 100, and may also have load-bearing functions as will be discussed in further detail below. The posts 102 may be formed integrally with the body 100 of the thermoelectric cooling unit 50, or may be formed as separate pieces that are then attached to the body 100, such as via fasteners, welding, adhesives, or any other suitable means. The posts 102 may be formed from the same material as the body 100, or may be from a different material that has sufficient load-bearing capacity. The thermoelectric cooling unit 50 further includes a heat sink 110, which may be formed with a substantially circular profile from a highly thermally conductive material, such as aluminum, copper, or composite materials. The heat sink 110 includes a plurality of pin fins, which may be formed on a bottom surface of the heat sink 110 and extend downwardly as shown in FIG. 34. The number, dimension, and location of the pin fins may be optimized to achieve the desired heat exchange properties for the head sink 110. The heat sink 110 may also include a standoff element 114, which may be located on a top surface of the heat sink 112 and protrude upwardly to support a Peltier element 120, which may be arranged directly on top of the standoff element 114 of the heat sink 110. The standoff element 114 is preferably formed from the same material as the rest of the heat sink 110, and may be formed integrally with the heat sink 110, or as a separate piece that is then attached to the heat sink 110 such as via an adhesive, fastener, welding, or other appropriate means. Alternatively, the heat sink 110 may be formed without a standoff element 114, and the Peltier element 120 may instead be supported directly by the top surface of the heat sink 110. While the bottom surface of the Peltier element 118 is preferably in thermal contact with the heat sink 110, the top surface of the Peltier element 118 is preferably in thermal contact with a cold plate 120, which may be used to draw heat away from a container placed on the cold plate 120 to cool the contents of the container, as will be discussed in further detail below. As shown in FIG. 34, an insulating element 116 may be arranged between the heat sink 110 and the cold plate 120, such that heat transfer is restricted to the cold plate 120, Peltier element 118, and heat sink 110. The insulating element 116 may be made from any suitable thermally insulating material, such as foam insulation. A bezel 117 may be used to close out the space between the cold plate 120 and heat sink 110, such that the components within cannot be seen from the exterior of the thermoelectric cooling unit 50 and to help prevent dust, water, and other external elements from entering the thermoelectric cooling unit 50.

Figure 33:
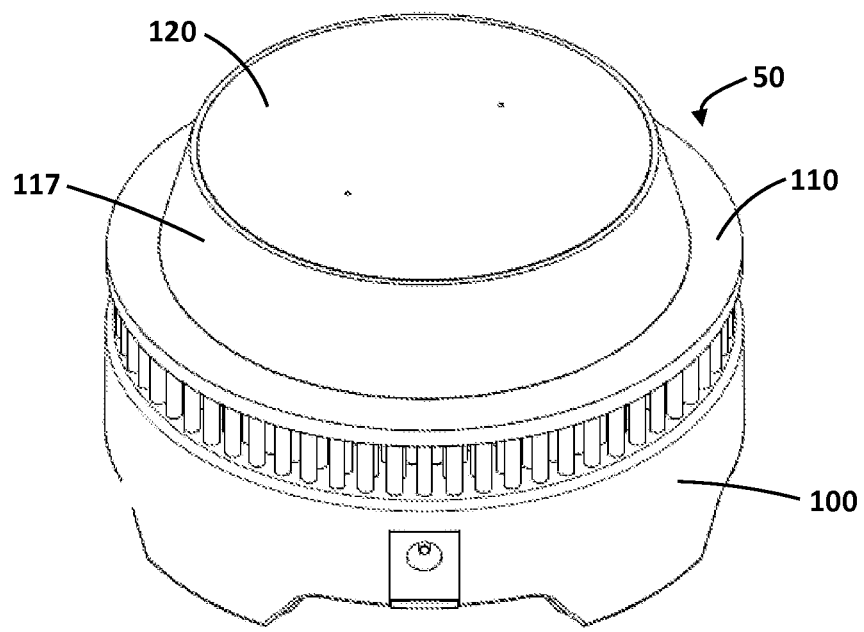
FIG. 33 is a front perspective view of a thermoelectric cooling unit that may be used with the thermoelectrically cooled container 30 shown in FIG. 1.
Figure 35:
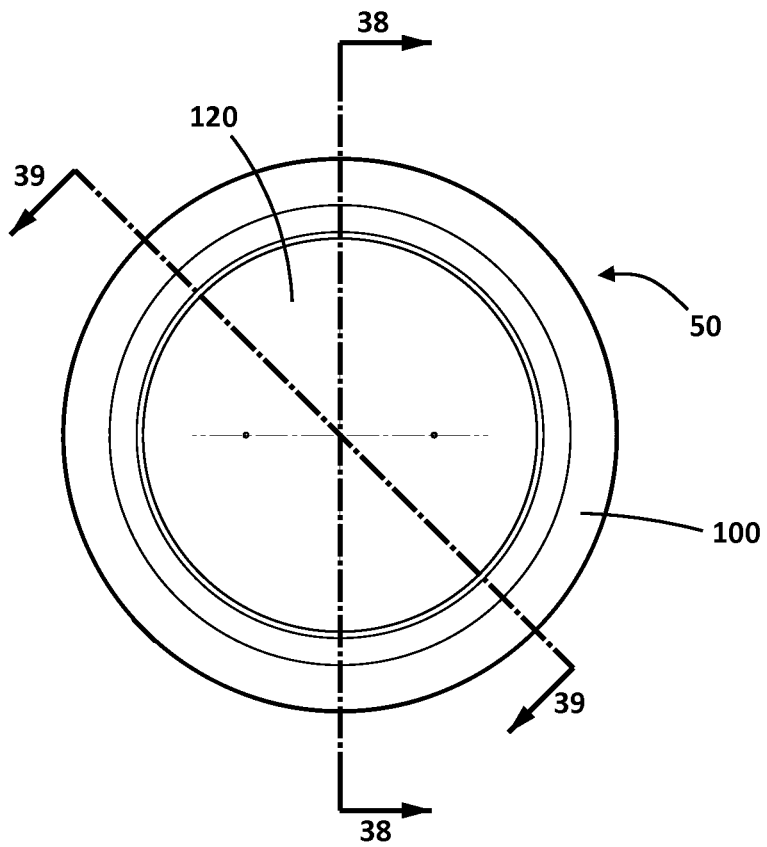
FIG. 35 is a top plan view of the thermoelectric cooling unit shown in FIG. 33.
Figure 36:
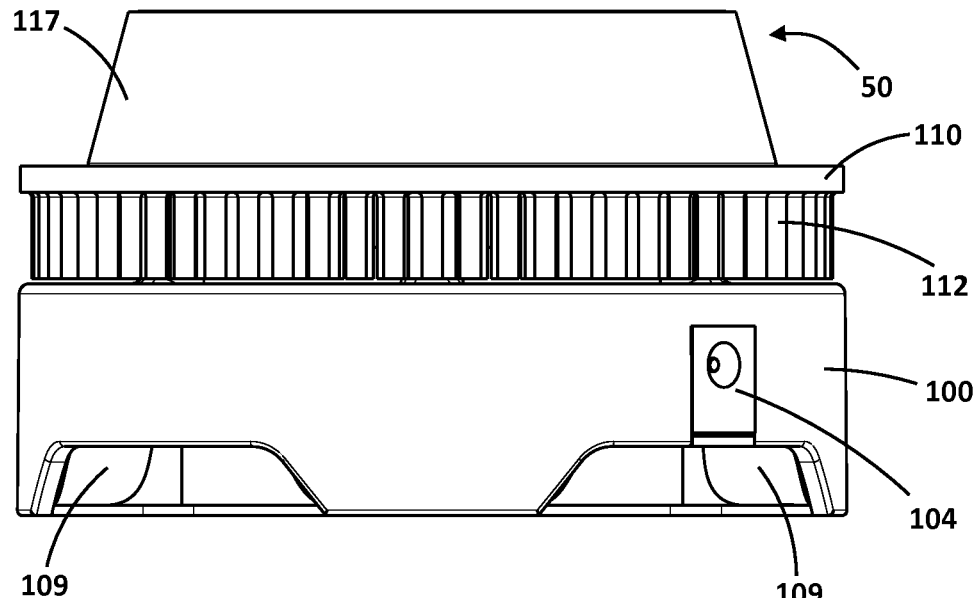
FIG. 36 is a front elevation view of the thermoelectric cooling unit shown in FIG. 33.
Figure 37:
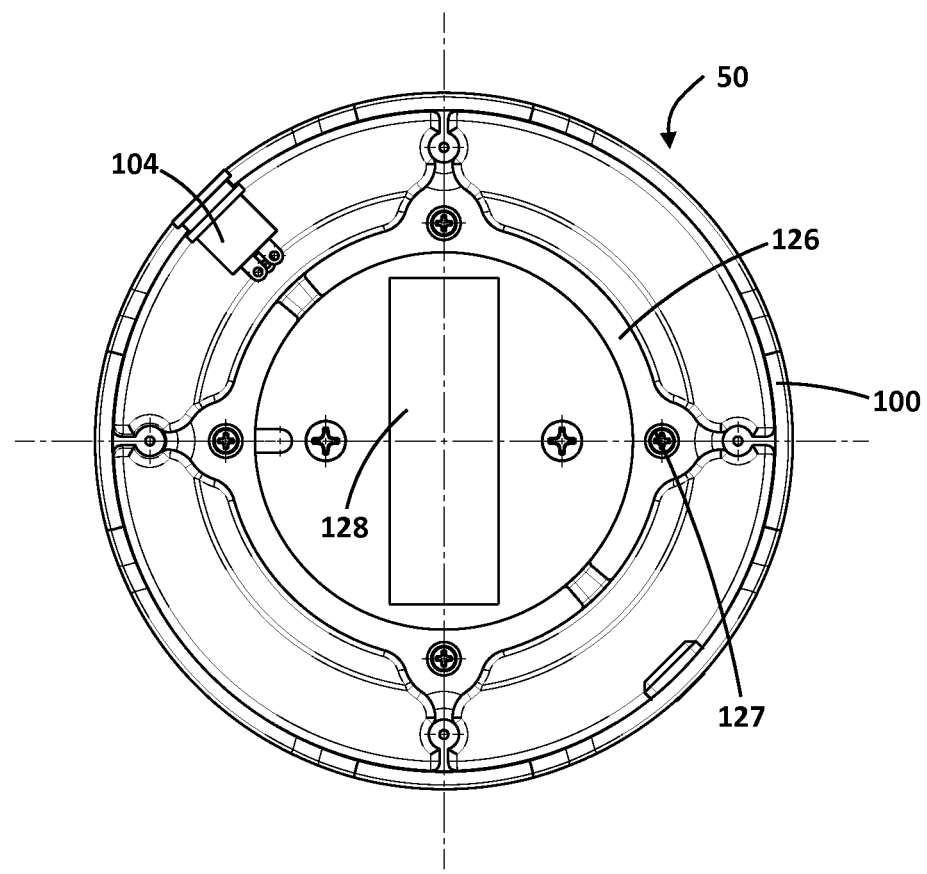
FIG. 37 is a bottom elevation view of the thermoelectric cooling unit shown in FIG. 33.
Figure 38:
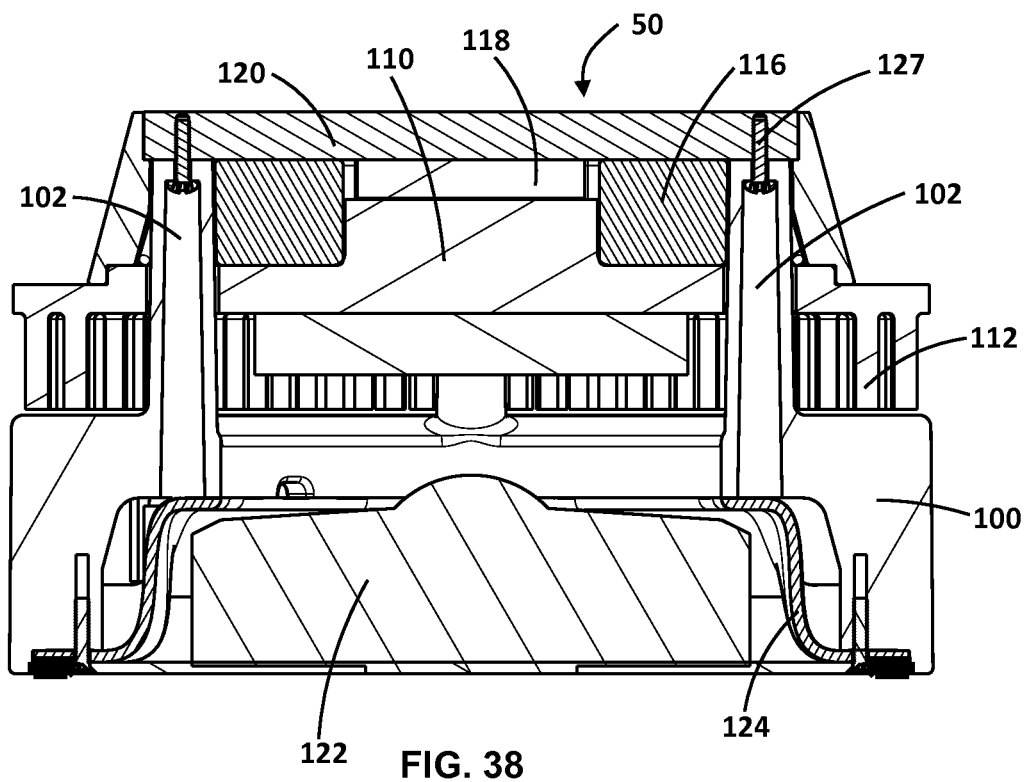
FIG. 38 is a cross-sectional view of the thermoelectric cooling unit shown in FIG. 33, taken along line 38-38.
Figure 39:
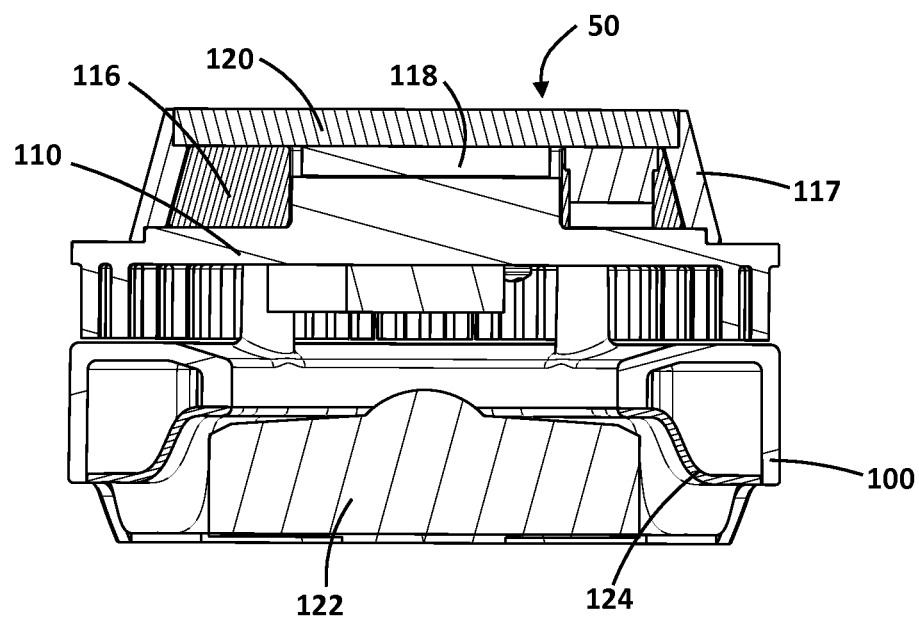
FIG. 39 is a cross-sectional view of the thermoelectric cooling unit shown in FIG. 33, taken along line 39-39.

As shown in FIG. 33, the pin fins 112 of the heat sink 110 are exposed to the exterior environment when the thermoelectric cooling unit 50 is in its assembled form. One of ordinary skill in the art would understand the basic operating principles of a heat sink, which will not be discussed in detail here. It suffices to say that the pin fins 112 of the heat sink 110 increase the surface area of the heat sink 110 in contact with the incoming air drawn in from the exterior of the thermoelectric cooling unit 50, and thus increases the heat dissipation capabilities of the heat sink 110. One of ordinary skill in the art would further appreciate that although the present heat sink 110 is shown with pin fins 112, other types of fins with different cross sections may also be used to achieve the same cooling functions. For example, instead of having a plurality of pins, the present heat sink 110 may be formed with straight fins that run the entire length of the heat sink 110, flared fins, or crosscut fins. As shown in FIG. 34, the heat sink 110 may be formed with a plurality of through openings 111 through which the posts 102 of the body 100 may extend when the thermoelectric cooling unit 50 is in its assembled form. When assembled, the posts 102 of the body 100 extend through the heat sink 110 to directly support the cold plate 120, as shown in FIGS. 3, 38, and 39. The cold plate 120 may be secured to the posts 102 using any suitable means, such as a thermal adhesive or a mechanical fastener. This arrangement is advantageous in that the weight of the cold plate 120 and any object placed on the cold plate 120 can be entirely transferred to the body 100 of the thermoelectric cooling unit 50 through the posts 102, thus placing no mechanical load on the delicate Peltier element 118, the pin fins 112 of the heat sink 110, or any of the other intermediate elements such as the insulating element 116 or the bezel 117. This minimizes the possibility of damaging the Peltier element 118 during normal use, and ensures that all mechanical loads of the system are borne by the body 110, which is configured to provide sufficient structural support. Alternatively, the posts 102 may be formed integrally with or attached to the cold plate 120 instead of the body 100 to achieve the same benefit. In view of this arrangement, the various components of the present thermoelectric cooling unit 50 should be machined or otherwise sized to very close tolerances, such that the Peltier element 118 can be in thermal contact with both the heat sink 110 and the cold plate 120, while taking little to no mechanical load from the cold plate 120, which should be entirely supported by the posts 102 of the body 100. To ensure this is the case, the components may be sized such that there is a slight gap between the Peltier element 118 and at least one of the cold plate 120 or the heat sink 110 when in the assembled stage, the gap being filled with a thermally conductive material such as foam or an adhesive.

As further shown in FIG. 34, the present thermoelectric cooling unit 50 includes a fan 122 arranged within the body 100 below the heat sink 110. The fan 122 is preferably a radial fan having blades that spin in a circumferential direction. The fan 122 being configured to draw air from the exterior of the thermoelectric cooling unit 50 inwardly along the radial direction through the pin fins 112 of the heat sink 110, and then expel the hair downward axially and outward radially from the bottom of the body 100, such as through one or more vents 109 located at the bottom of the body 100. A duct cowling 124 may be arranged above the fan 122 and below the heat sink 110 to help guide the airflow into and out of the thermoelectric cooling unit 50. The duct cowling 124 is a curved plate having a central opening, the curved profile providing a smooth pathway for airflow, as air is drawn in through the central opening at the top of the curved duct cowling 124. A base plate 126 may be arranged at and connected to the bottom of the body 100 to close out the assembly after all the components have been assembled. One of ordinary skill in the art would appreciate that the various components of the thermoelectric cooling unit 50 may be assembled and connected to each other in a variety of manners, such as, for example and without limitation, by using mechanical connections, adhesives, welding, fasteners, force-fits, or any other suitable means. As shown in FIGS. 3 and 34, components such as the body 100 and the cold plate 120, as well as the base plate 126 and duct cowling 124 may be attached to each other using threaded screws 127.

Figure 11:
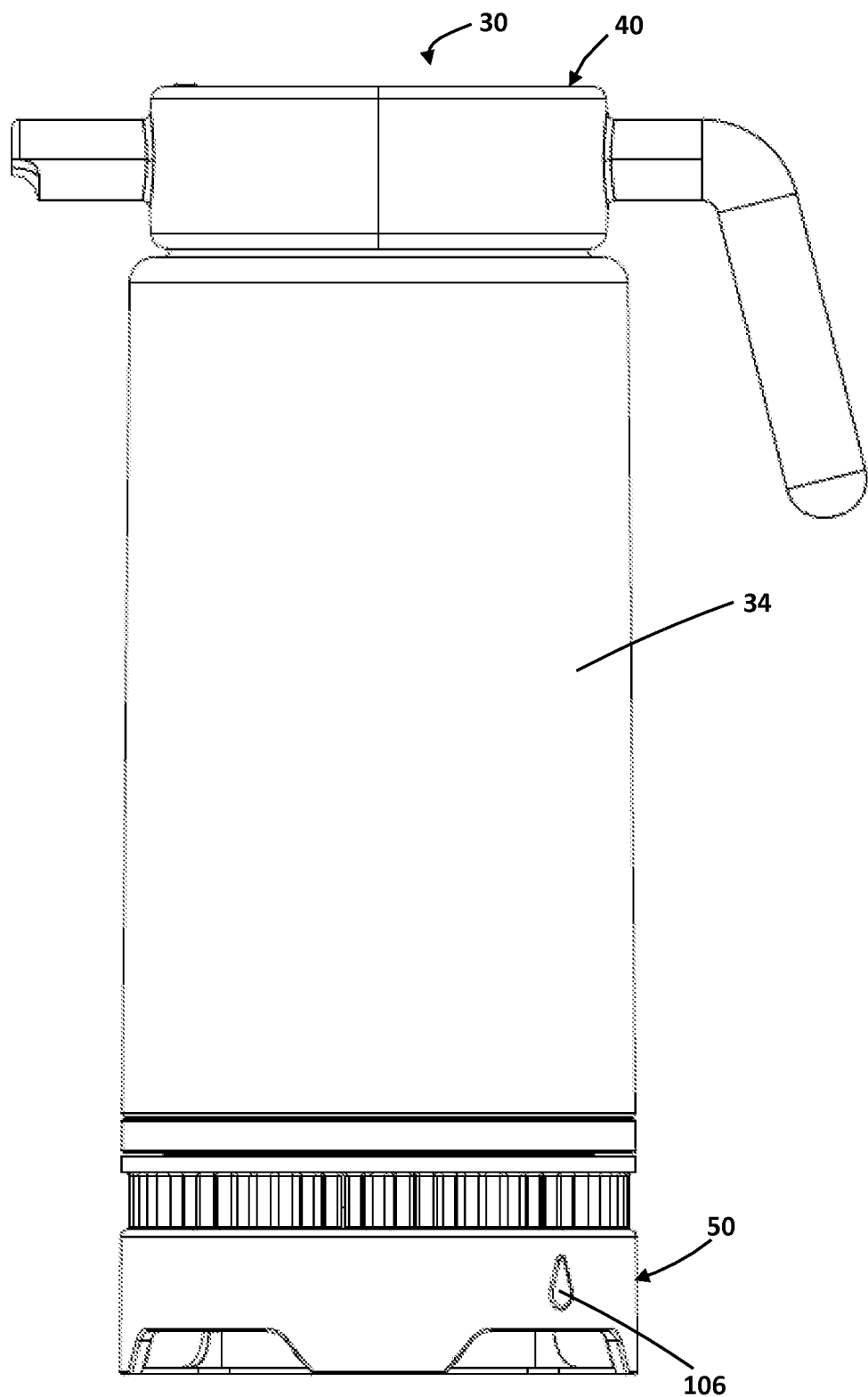
FIG. 11 is a back elevation view of the thermoelectrically cooled container shown in FIG. 1.
Figure 12:
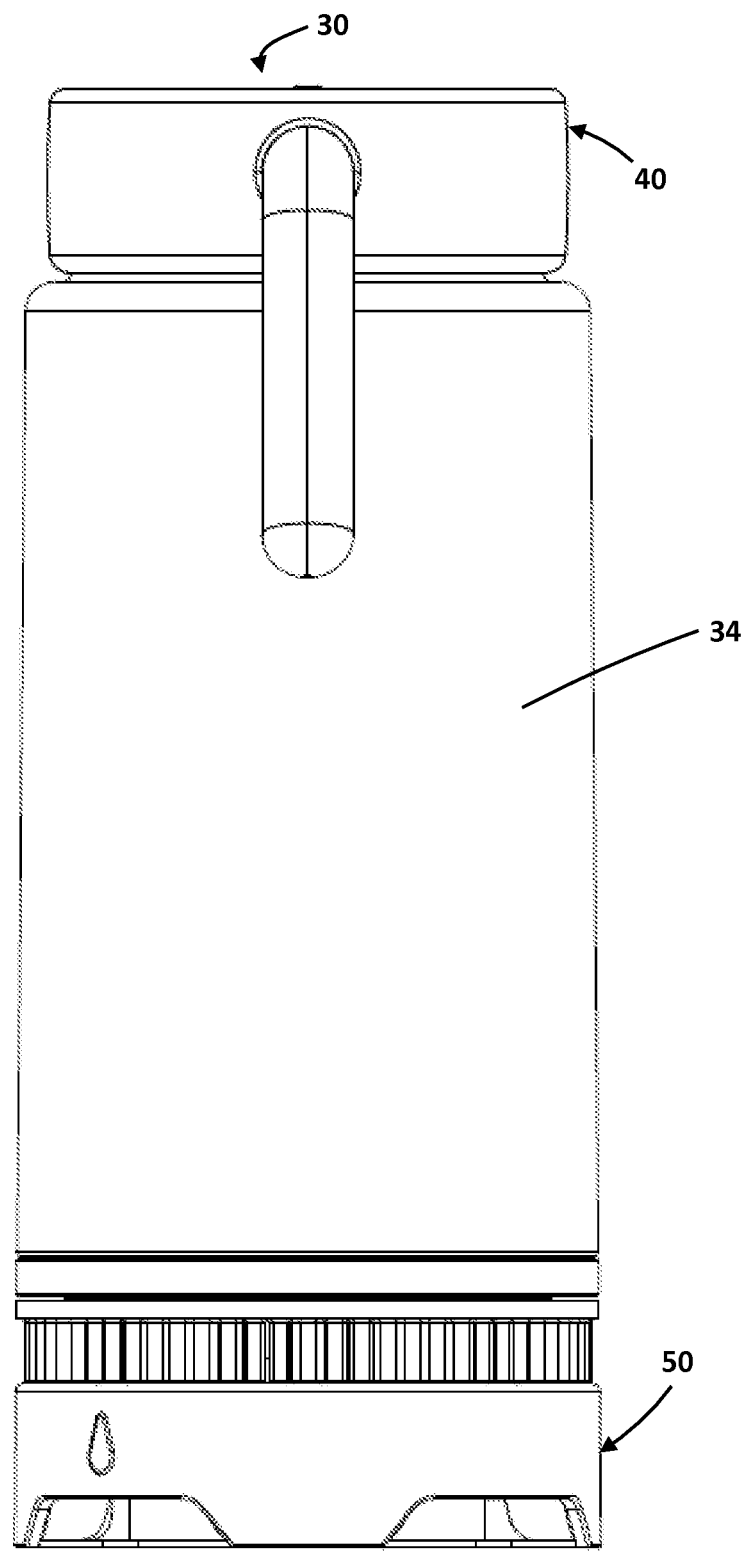
FIG. 12 is a left elevation view of the thermoelectrically cooled container shown in FIG. 1.
Figure 13:
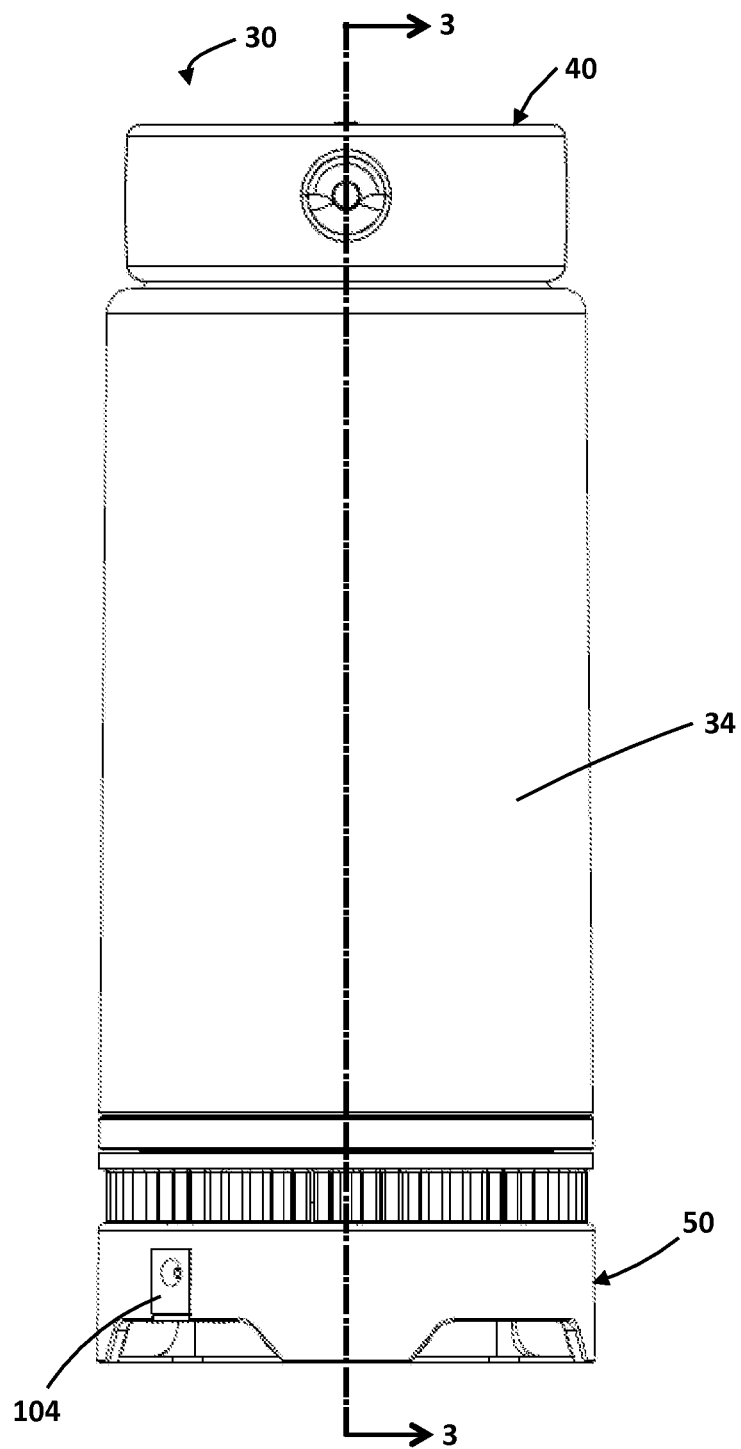
FIG. 13 is a right elevation view of the thermoelectrically cooled container shown in FIG. 1.
Figure 14:
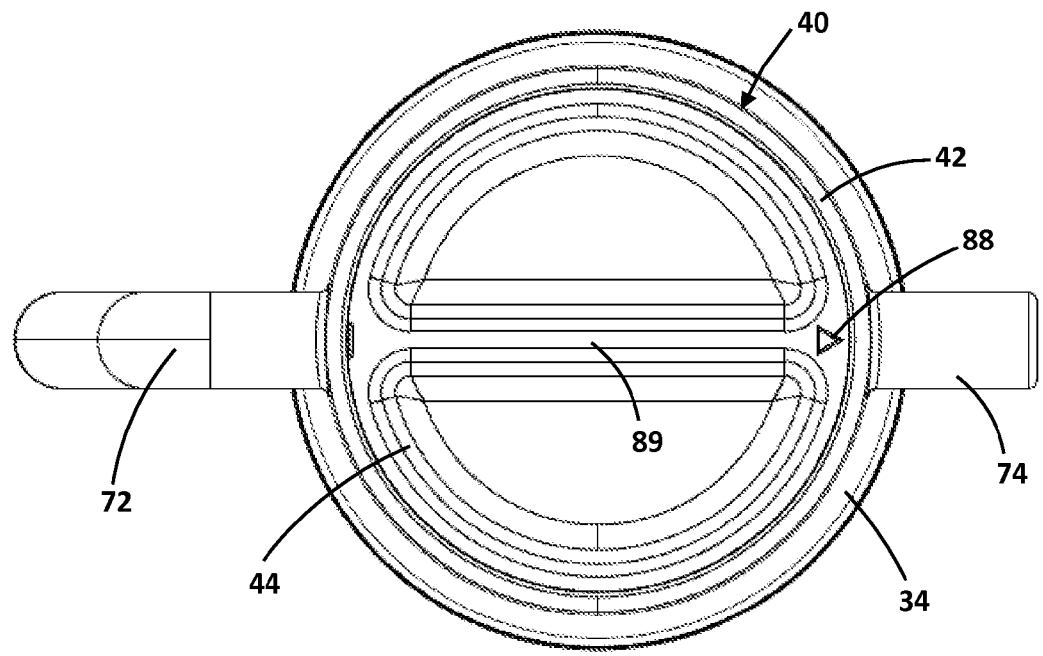
FIG. 14 is a top plan view of the thermoelectrically cooled container shown in FIG. 1.
Figure 15:
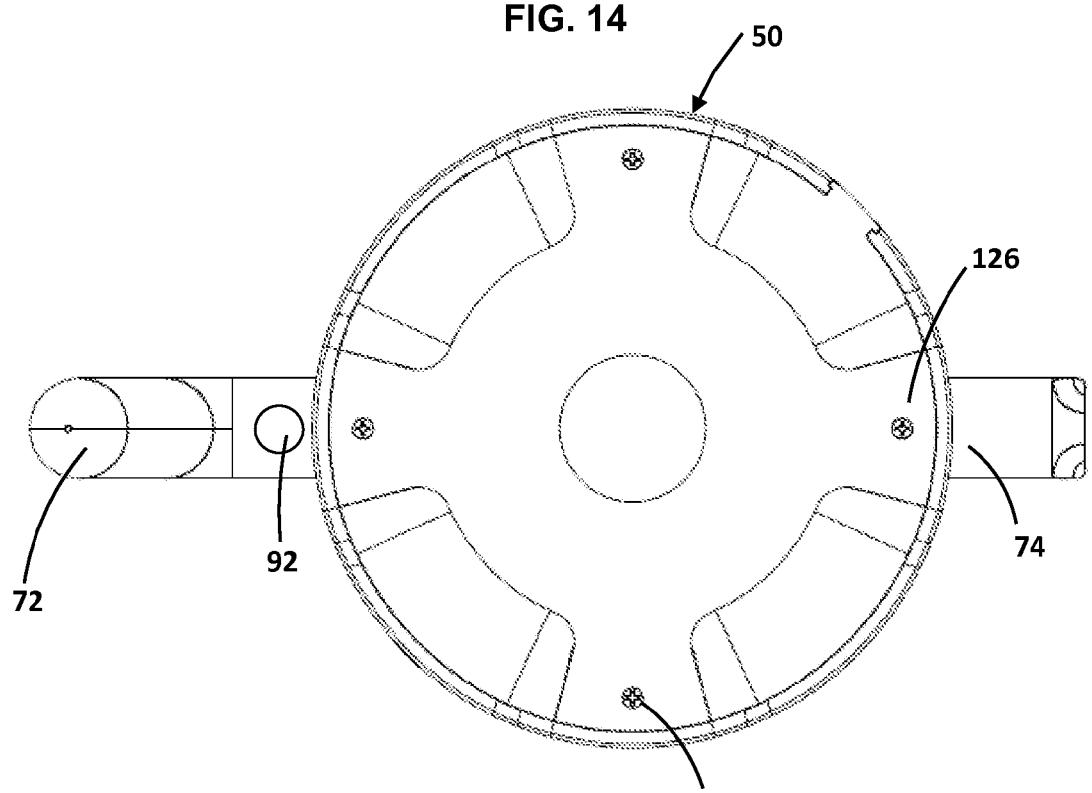
FIG. 15 is a bottom plan view of the thermoelectrically cooled container shown in FIG. 1.

The body 100 may further include a power jack 104 configured to be connected to an external power source, such as via a conventional power adapter. The body 100 may also be associated with an LED light 106, which may be visible to the user and may be automatically turned on or off to indicate whether the thermoelectric cooling unit 50 is active or not, as shown in FIGS. 11 and 12. One or more sensors 108 may be associated with at least one of the cold plate 120, Peltier element 118, heat sink 110, or body 110 to determine when a container such as the container body 34 discussed above and shown in FIGS. 1-15 has been placed on the cold plate 120, and whether to actuate the Peltier element 118 to provide cooling of the container. For example and without limitation, the sensors 108 may include a Hall effect sensor, which is a transducer that varies its output voltage in response to a magnetic field. As discussed above, the container body 34 may include a magnetic ring 66 built into the base 37. When the container body 34 is placed on the present thermoelectric cooling unit 50, the Hall effect sensor detects the presence of the magnetic ring 66, and triggers the Peltier element 118 to begin cooling the contents of the container body 34. For further example and without limitation, the sensors 108 may also include a temperature sensor that is configured to detect the temperature of the container body 34 or the cold plate, and to selectively actuate the Peltier element 118 to begin or stop cooling the container body 34 such that the contents are kept at a desired temperature range. In order to power and regulate the various components discussed above, the thermoelectric cooling unit 50 also includes an electronics assembly 128, which may be in communication with the Peltier element 118, the fan 122, the LED light 106, the one or more sensors 108, and the external power source to regulate operations of the thermoelectric cooling unit 50. The electronics assembly 128 may be or include, for example and without limitation, a printed circuit board and may be mounted to the bottom of the heat sink 110 or to the body 100. Electronics assemblies having logical circuits and other functions configured to control various electrical components are well known in the art and will not be discussed in detail herein.

Figure 40:
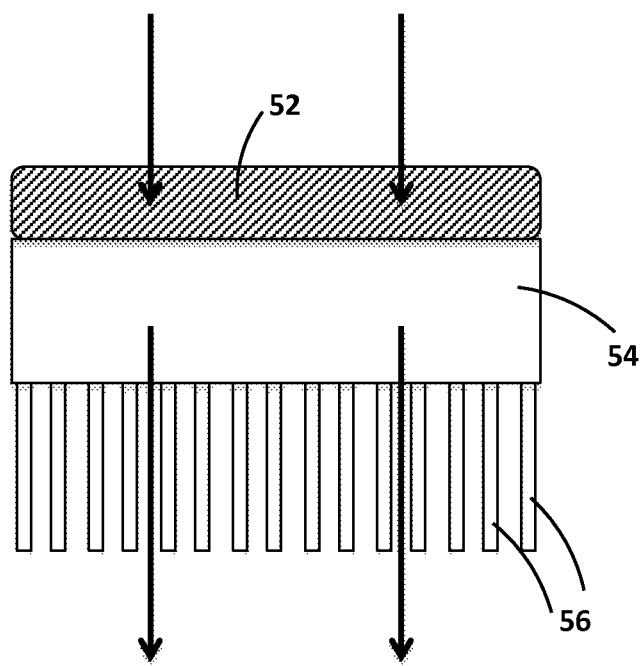
FIG. 40 is a prior art axial heat sink and fan assembly.

The particular heat sink 110 and fan 122 design and arrangement of the thermoelectric cooling unit 50 presents a radial setup, which is advantageous over known heat sink assemblies that utilize an axial fan setup. In known heat sinks with an axial fan set up, the fan is located above a heat sink having fins that extend downwards, the fan draws in air from above and blows the air downward through the fins of the heat sink along the axial direction, as shown in FIG. 40. In contrast, the present thermoelectric cooling unit 50 utilizes a radial fan and heat sink setup, which is more compact than an axial setup and increases efficiency of the system, such that a less powerful fan 122 may be used, or run at a slower speed, which in turn reduces noise and power consumption. FIG. 3 illustrates how the present thermoelectric cooling unit 50 cools the contents of the container body 34 using a radial setup of the heat sink 110 and fan 122, with the pin fins 112 of the heat sink 110 exposed to the external atmosphere to facilitate airflow in the radial direction. As shown in FIG. 3, assuming the contents of the container body 34 are at a lower temperature than the external atmosphere, as time passes heat from the external atmosphere is transferred to the contents of the container body 34, as shown by the dotted arrows labeled H. If the container body 34 were not already associated with the thermoelectric cooling unit 50, the user would be required to place the container body 34 on the thermoelectric cooling unit 50 to begin cooling the contents of the container body 34. Alternatively, if the container body 34 is already placed on the thermoelectric cooling unit 50, and the container body 34 reaches a certain predetermined temperature, the temperature sensor in the thermoelectric cooling unit 50 may operate in conjunction with the electronics assembly 128 to automatically begin cooling the container body 34. As shown in FIG. 3, heat H from the contents within the internal cavity 36 of the container body is transferred through the inner container 60 and the sleeve 62 directly into the cold plate 120. The Peltier element 118, which is in thermal contact with the cold plate 120 on one side and the heat sink 110 on the other side, actively transfers heat from the cold plate 120 to the heat sink 110. As shown by the dotted arrows labeled A in FIG. 3, incoming air is drawn in from the exterior of the thermoelectric cooling unit 50 by the radial fan 122, and the air flows radially inwardly along the pin fins 112 of the heat sink 110 to efficiently dissipate heat from the heat sink 110. Once the incoming air reaches the center of the heat sink 110, it is drawn downwardly through the central opening of the duct cowling and guided outwardly along the radial direction until it is expelled from the bottom of the body 100 of the thermoelectric cooling unit 50, as shown by the additional dotted arrows labeled A. By arranging a radial fan 122 under the heat sink 110 to remove heat from the pin fins 112 along the radial direction instead of axially like in known heat sink setups, the present thermoelectric cooling unit 50 is able to achieve high efficiencies with a compact and low noise design. The thermoelectric cooling unit 50 may continue operating in the manner described above until sufficient heat has been removed from the contents of the container body 34, and if a temperature sensor is used, the temperature sensor may detect that the container body 34 has reached the desired temperature and automatically shut off the fan 122 and Peltier element 118. The LED light 106 may be used to indicate whether the thermoelectric cooling unit 50 is active, such as by lighting up only when the container body 34 is being cooled.

The entire container body 34 being selectively removable from the thermoelectric cooling unit 50 is advantageous in many ways. Since the container body 34 is cooled directly through the cold plate 120 and the cooling operation may be triggered by proximity, such as through the use of a magnetic ring 66 in the container body 34 and a Hall effect sensor in the thermoelectric cooling unit 50, there are no additional electric or physical connections required between the container body 34 and thermoelectric cooling unit 50. This presents a cleaner aesthetic design, facilitates easy cleaning, and reduces the possibility that external debris may interfere with the association between the container body 34 and the thermoelectric cooling unit 50. The user may easily maintain the temperature of the contents of the container body 34 by leaving the container body 34 on the thermoelectrically cooled unit 50, which will automatically sense when cooling is required, and removing the container body 34 when the user desires to dispense the contents therein. Unlike other known cooling systems, the present thermoelectrically cooled container 30 has a very small footprint, has low power consumption and may be operated using a regular electrical outlet, can be easily disassembled and cleaned, and presents an aesthetically pleasing overall design.

Figure 41:
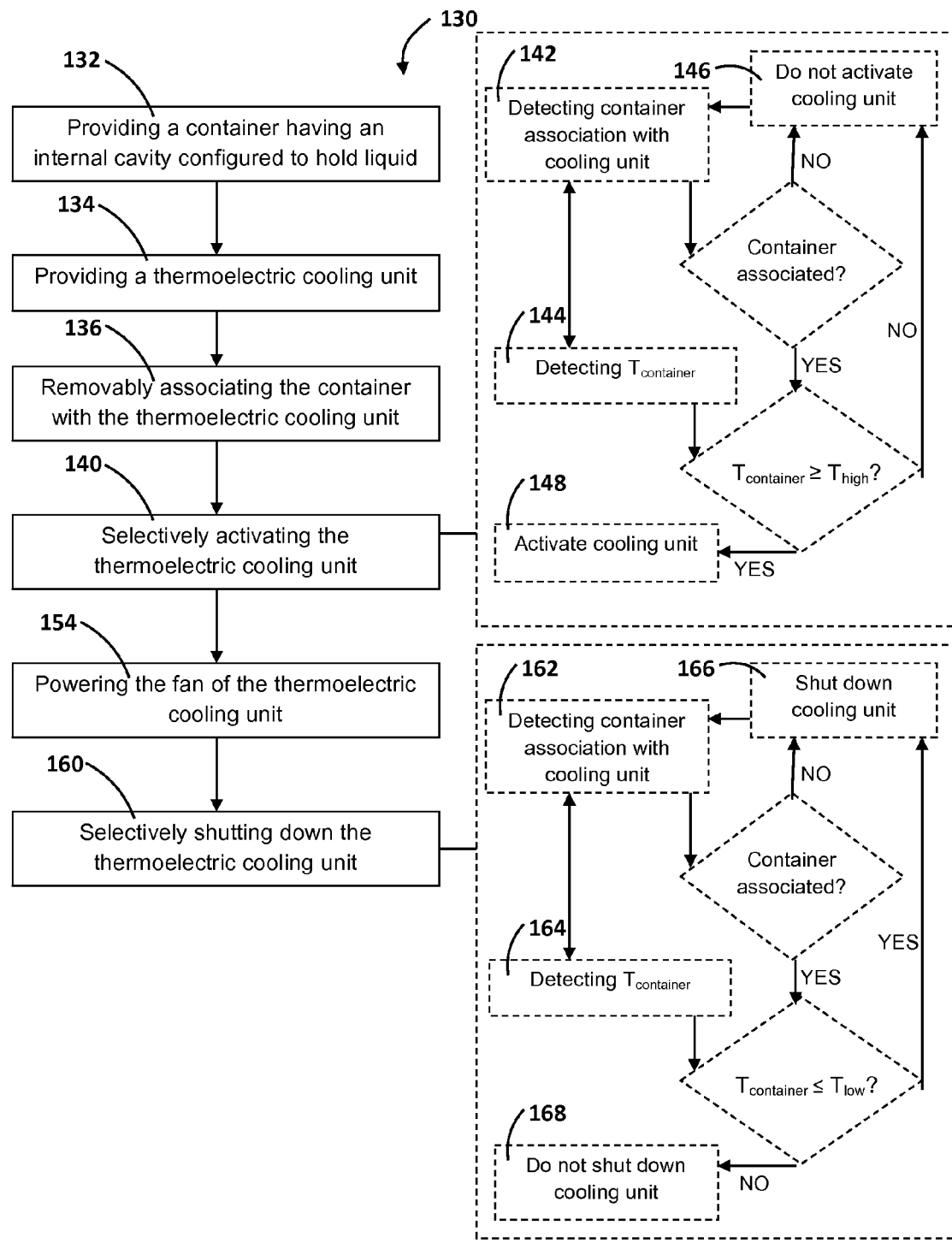
FIG. 41 is a flow diagram illustrating a method of thermoelectrically cooling the contents of a container.

A method 130 of thermoelectrically cooling the contents of a container is also disclosed, as illustrated by the flow diagram of FIG. 41. Reference numerals for the elements shown in FIGS. 1-40 and discussed above are used for the same elements below, and detailed descriptions of those elements are omitted for sake of brevity. The present method may be implemented, for example and without limitation, using the container body 34, lid assembly 40, and thermoelectric cooling unit 50 shown in FIGS. 1-40 and discussed above, or using any other container, lid assembly, and thermoelectric cooling apparatus having suitable properties and functionalities. Portions of the flow diagram shown in dotted lines represent optional steps or groupings of steps. One of ordinary skill in the art would recognized that while each step of the flow diagram of FIG. 41 is shown and described separately, multiple steps may be executed in a different order than what is shown, in parallel with each other, or concurrently with each other.

As shown in FIG. 41, the present method 130 of thermoelectrically cooling the contents of a container includes a step 132 of providing a container having an internal cavity configured to hold a liquid therein, such as the container body 34 discussed above. The present method 130 further includes a step 134 of providing a thermoelectric cooling unit, such as the thermoelectric cooling unit 50 discussed above, that includes a cold plate 120, a Peltier element 118 associated with the cold plate 120, a heat sink 110 associated with the Peltier element 118, the heat sink 110 having a plurality of fins 112 that extend along an axial direction, a fan 122 arranged below the heat sink 110, and a body 100 arranged around the fan 122. The method 130 also includes a step 136 of removably associating the container 34 with the thermoelectric cooling unit 50, such as by placing the container 34 on to and in physical contact with the thermoelectric cooling unit 50, a step 140 of selectively activating the thermoelectric cooling unit 50 and powering the Peltier element 118 to transfer heat from the cold plate 120 to the heat sink 110, and a step 154 of powering the fan 122 of the thermoelectric cooling unit 50. When the fan 112 is powered, it draws air from an exterior of the thermoelectric cooling unit 50 through the fins 112 of the heat sink 110 inwardly along a radial direction that is substantially perpendicular to the axial direction, and expels the air downwardly along the axial direction and outwardly along the radial direction from an interior of the thermoelectric cooling unit 50 to the exterior. This allows the heat from the contents of the container 34 to be transferred through the cold plate 120 to the heat sink 110 and then dissipated via incoming air to the external atmosphere, thus cooling the contents of the container 34. The present method 130 also includes a step 160 of selectively shutting down the thermoelectric cooling unit 50 to discontinue power to the Peltier element 118 and the fan 122, which may be done automatically once cooling of the contents of the container 34 is no longer required.

The step 140 of selectively activating the thermoelectric cooling unit 50 may be achieved by any suitable means, such as by using an electronics assembly 128 of the thermoelectric cooling unit 50 to determine whether one or more conditions for activation are met. One of ordinary skill in the art would recognize that there are many ways of determining whether the thermoelectric cooling unit 50 should be activated, and to automate part or all of the process so that no user intervention is required aside from associating the container 34 with the thermoelectric cooling unit 50. As shown in FIG. 41, the step 140 of selectively activating the thermoelectric cooling unit 50 may include the following specific steps: a step 142 of detecting whether the container 34 is associated with the thermoelectric cooling unit 50; and a step 144 of detecting whether a temperature of the container 34 is at or above a predetermined threshold temperature $T_{high}$. These detection steps 142, 144 may be performed in any order or concurrently, and may be achieved using one or more sensors 108 in the thermoelectric cooling unit 50, which may be controlled by an electronics assembly 128 or other control means in the thermoelectric cooling unit 50. For example and without limitation, the step 142 of detecting whether the container 34 is associated with the thermoelectric cooling unit 50 may be achieved by utilizing a Hall effects sensor in the thermoelectric cooling unit 50 that detects the presence or proximity of a magnetic element 66 in the base 37 of the container body 34. Similarly, the step 144 of detecting whether a temperature of the container 34 is at or above the predetermined threshold temperature $T_{high}$ may be achieved by utilizing a temperature sensor in the thermoelectric cooling unit 50 that detects the temperature of the container 34 when it is associated with the thermoelectric cooling unit 50. If it is determined that the container 34 is not associated with the thermoelectric cooling unit 50, the method 130 may proceed to the step 146 of not activating the thermoelectric cooling unit 50. If it is determined that the container 34 is associated with the thermoelectric cooling unit 50, but it is also determined that the temperature of the container 34 is not at or above the predetermined threshold temperature $T_{high}$, the method 130 once again proceeds to the step 146 of not activating the thermoelectric cooling unit 50. Preferably, the method 130 may periodically conduct the steps 142, 144 of detecting whether the container 34 is associated with the thermoelectric cooling unit 50 and detecting whether a temperature of the container 34 is at or above $T_{high}$, such that the thermoelectric cooling unit 50 can be automatically activated once the container 34 reaches the threshold temperature. In this manner, if a user places the container 34 on the thermoelectric cooling unit 50 while the container 34 is not yet warm enough to require cooling, the user can leave the container 34 without having to manually activate the cooling process because the thermoelectric cooling unit 50 will periodically conduct a temperature check 144 and automatically begin cooling the container 34 when it is necessary. If it is determined that the container 34 is associated with the thermoelectric cooling unit 50 and that the temperature of the container 34 is at or above the predetermined threshold temperature $T_{high}$, the method 130 may proceed to the step 148 of activating the thermoelectric cooling unit 50 and powering the Peltier element 118 to transfer heat from the contents of the container 34 through the cold plate 12o to the heat sink 110. Although the flow diagram of FIG. 41 shows the detecting steps 142, 144 in a particular order, one of ordinary skill in the art would understand that the order of the detecting steps 144, 142 may be reversed so that the temperature of the container 34 is determined before determining the association of the container 34, and that the two steps 142, 144 may be conducted concurrently instead of after each other.

Similarly, the step 160 of selectively shutting down the thermoelectric cooling unit 50 may include the following specific steps, as shown in FIG. 41: a step 162 of detecting whether the container 34 is associated with the thermoelectric cooling unit 50; and a step 164 of detecting whether a temperature of the container is at or below a predetermined threshold temperature $T_{low}$. These steps 162, 164 may be achieved in the same manner already discussed above, such as by using sensors 108 in the thermoelectric cooling unit 50 and a central control unit such as the electronics assembly 128. If it is determined that the container 34 is not associated with the thermoelectric cooling unit 50, such as when the user removes the container 34 for use, the method 130 may proceed to the step 166 of shutting down the thermoelectric cooling unit 50 to discontinue cooling of the container 34. If it is determined that the container 34 is associated with the thermoelectric cooling unit 50, but that the temperature of the container 34 is at or below the predetermined threshold temperature $T_{low}$, such that the cooling process is complete, the method 130 may proceed to the step 166 of shutting down the thermoelectric cooling unit 50. This prevents the thermoelectric cooling unit 50 from over-cooling the contents of the container 34. If it is determined that the container 34 is associated with the thermoelectric cooling unit 50, but that the temperature of the container 34 is not at or below $T_{low}$, the method 130 may proceed to the step 168 of not shutting down the thermoelectric cooling unit 50 and to continue the cooling process, but periodically conducting the steps 162, 164 of detecting the presence of the container 34 and detecting the temperature of the container 34 so that the cooling process can be stopped at the appropriate time. As discussed above, these steps 162, 164 may be performed in a different order than what is shown in FIG. 41, and may further be performed concurrently. Furthermore, although the steps 144, 164 of detecting a temperature of the container is at, above, or below a predetermined threshold temperature $T_{high}$ or $T_{low}$ has been described with respect to a specific predetermined temperature, $T_{high}$ or $T_{low}$ may instead be a specific predetermined temperature range. This helps ensure that the thermoelectric cooling unit 50 is not selectively activating or shutting down repeatedly due to small temperature fluctuations as the container is approaching the appropriate temperature at which the cooling process begins or finishes. Determining whether the temperature of the container 34 is within a predetermined range instead of a specific temperature is advantageous in that it extends the life of the thermoelectric cooling unit 50 by reducing the number of activations and shutdowns, reduces energy usage, and reduces noise from repeated activations of the fan 122.

While various methods, configurations, and features of the present inventions have been described above and illustrated in the drawings, one of ordinary skill will appreciate from the disclosure that any combination of the above features can be used without departing from the scope of the present application. It is also recognized by those of ordinary skill in the art that many changes, only a few of which are exemplified in the detailed description above, may be made to the above described methods and embodiments without departing from the broad inventive concepts and principles embodied therein. The present embodiments are therefore to be considered in all respects as illustrative and not restrictive, the scope of the inventions being indicated by the appended claims rather than by the foregoing description, and all changes which come within the meaning and range of equivalency of the claims are therefore to be embraced therein.

What is claimed is:

1. A thermoelectric cooling apparatus comprising:
   a cold plate;
   a heat sink associated with the cold plate, the heat sink having one or more fins that extend in an axial direction;
   a Peltier element associated with the cold plate and the heat sink, wherein the Peltier element is arranged below the cold plate along the axial direction and in contact with the cold plate, and the heat sink is arranged below the Peltier element along the axial direction, the heat sink having an upper surface that is in contact with the Peltier element and a bottom surface from which the one or more fins extend downwardly;
   a fan arranged below the fins of the heat sink along the axial direction, the fan having blades that spin in a circumferential direction, and being configured to move air with respect to the one or more fins of the heat sink in a radial direction that is substantially perpendicular to the axial direction; and
   a body arranged around the fan, wherein the body includes one or more posts that extend upward axially through one or more corresponding openings in the heat sink, the one or more posts having a bottom end associated with the body and a top end that contacts the cold plate such that any axial load on the cold plate is substantially transferred to the body instead of the Peltier element or heat sink.

2. The thermoelectric cooling apparatus of claim 1, wherein the cold plate includes one or more posts that extend downward axially through one or more corresponding openings in the heat sink, the one or more posts having a top end associated with the cold plate and a bottom end that contacts the body such that any axial load on the cold plate is substantially transferred to the body instead of the Peltier element or heat sink.

3. The thermoelectric cooling apparatus of claim 1, further comprising a curved plate arranged within the body axially between the heat element and the fan, the curved plate having a central opening and being configured to facilitate air flow from outside of the body inward radially with respect to the one or more fins of the heat sink, then downward axially to be expelled through a bottom vent of the body.

4. The thermoelectric cooling apparatus of claim 1, further comprising a base plate associated with a bottom portion of the body.

5. The thermoelectric cooling apparatus of claim 1, further comprising a container removably associated with the cold plate.

6. The thermoelectric cooling apparatus of claim 1, further comprising a thermal adhesive disposed between the cold plate and the one or more posts of the body.

7. The thermoelectric cooling apparatus of claim 1, further comprising a sensor associated with at least one of the cold plate, Peltier element, heat sink or body.

8. The thermoelectric cooling apparatus of claim 6, further comprising an electronic assembly in communication with at least one of the Peltier element, the fan, the sensor, and an external power source.

9. The thermoelectric cooling apparatus of claim 7, wherein the sensor is a temperature sensor.

10. The thermoelectric cooling apparatus of claim 9, wherein the temperature sensor is configured to selectively actuate the Peltier element.

11. A thermoelectric cooling apparatus comprising:
    a cold plate;
    a heat sink associated with the cold plate, the heat sink having one or more fins that extend in an axial direction;
    a Peltier element associated with the cold plate and the heat sink, wherein the Peltier element is arranged below the cold plate along the axial direction and in contact with the cold plate, and the heat sink is arranged below the Peltier element along the axial direction, the heat sink having an upper surface that is in contact with the Peltier element and a bottom surface from which the one or more fins extend downwardly;
    a fan arranged below the fins of the heat sink along the axial direction, the fan having blades that spin in a circumferential direction, and being configured to move air with respect to the one or more fins of the heat sink in a radial direction that is substantially perpendicular to the axial direction; and
    a body arranged around the fan, wherein the cold plate includes one or more posts that extend downward axially through one or more corresponding openings in the heat sink, the one or more posts having a top end associated with the cold plate and a bottom end that contacts the body such that any axial load on the cold plate is substantially transferred to the body instead of the Peltier element or heat sink.

12. The thermoelectric cooling apparatus of claim 11, further comprising a curved plate arranged within the body axially between the heat element and the fan, the curved plate having a central opening and being configured to facilitate air flow from outside of the body inward radially with respect to the one or more fins of the heat sink, then downward axially to be expelled through a bottom vent of the body.

13. The thermoelectric cooling apparatus of claim 11, further comprising a container removably associated with the cold plate.

* * * * *